(12) United States Patent
Nozaki et al.

(10) Patent No.: US 7,536,545 B2
(45) Date of Patent: May 19, 2009

(54) NAVIGATION APPARATUS, NAVIGATION SYSTEM, METHOD THEREOF, PROGRAM THEREOF, AND RECORDING MEDIUM THEREOF

(75) Inventors: Takashi Nozaki, Tokyo (JP); Kouji Amano, Tokyo (JP)

(73) Assignee: Increment P Corporation, Tokyo (JP)

( * ) Notice: Subject to any disclaimer, the term of this patent is extended or adjusted under 35 U.S.C. 154(b) by 624 days.

(21) Appl. No.: 10/382,997

(22) Filed: Mar. 7, 2003

(65) Prior Publication Data

US 2003/0177399 A1 Sep. 18, 2003

(30) Foreign Application Priority Data

Mar. 7, 2002 (JP) .............................. 2002-062613

(51) Int. Cl.
*G06F 12/14* (2006.01)
(52) U.S. Cl. ..................... 713/161; 707/103; 701/212
(58) Field of Classification Search .................. 713/1, 713/2, 188, 194, 161; 380/200, 201, 255, 380/277, 25; 726/2; 707/103; 701/212
See application file for complete search history.

(56) References Cited

U.S. PATENT DOCUMENTS 6,587,787 B1 * 7/2003 Yokota .......................... 701/212
6,957,229 B1 * 10/2005 Dyor ........................ 707/103 X

FOREIGN PATENT DOCUMENTS

| EP | 0 927921 A | 7/1999 |
| EP | 1 160694 A | 12/2001 |
| EP | 1 168715 A | 1/2002 |
| JP | 6-314248 | 11/1994 |
| JP | 8-97823 | 4/1996 |
| JP | 9-189558 | 7/1997 |
| JP | 09-264750 | 10/1997 |
| JP | 10-30932 | 2/1998 |
| JP | 11-194974 | 7/1999 |

(Continued)

OTHER PUBLICATIONS

Office Action dated Feb. 16, 2007-Notice of Reasons for Refusal.
European Search Report dated Sep. 17, 2004.
Japanese Office Action mailed Sep. 25, 2007 with English translation (3 pages).
Office Action issued for Japanese Patent Appln. No. 2002-062613 on Jun. 5, 2007.

*Primary Examiner*—Kimyen Vu
*Assistant Examiner*—Joseph Pan
(74) *Attorney, Agent, or Firm*—Kratz, Quintos & Hanson, LLP

(57) ABSTRACT

A system member of a data processing system 1 operates a terminal 3 to connect a server 5, and further to a site for creating a new group from a main site. A group name is registered, and a group ID and group password are then attained. Based on articles written on a point system registration card obtained in a shop, the member connects the terminal 3 to a registration site server 6 and inputs requirements, to register a point card. When registering points, an icon of "side trip" is operated so that shop data is transferred to the server 5, to input the shop data as data to be opened within the group. The shop data can be subjected to data processing such that the shop data can be disclosed as a favorite shop like a hiding place within a group.

9 Claims, 16 Drawing Sheets

FOREIGN PATENT DOCUMENTS

| | | |
|---|---|---|
| JP | 11-282863 | 10/1999 |
| JP | 2000-137643 | 5/2000 |
| JP | 2000-267914 | 9/2000 |
| JP | 2002-15215 | 1/2002 |
| WO | WO 01/35574 | 5/2001 |
| WO | WO 02/05132 A | 1/2002 |

* cited by examiner

FIG.6

| PERSONAL LIST TABLE ||||||
|---|---|---|---|---|---|
| USER ID | NAME | ADDRESS | E-MAIL ADDRESS | ..... | SYSTEM POINT |
| 00001 | ○○ ○○ | SETAGAYA-KU, TOKYO... | 00000@000.CO.JP | ..... | 100 |
| 00002 | ×× ×× | YOKOHAMA-SHI, KANAGAWA... | 00000@000.CO.JP | ..... | 250 |

FIG.7

| GROUP LIST TABLE |||||||
|---|---|---|---|---|---|---|
| GROUP ID | PASSWORD | GROUP NAME | CREATOR(ID) | MEMBER ID | TIME | DATE |
| G0001 | BC5EJ20G | EXCESSIVE EATER | 00001 | 00356 | 09:32 | 20011221 |
| G0001 | BC5EJ20G | EXCESSIVE EATER | 00001 | 00357 | 09:32 | 20011221 |
| G0002 | BC8EJ20R | SANTA HUNTER | 00002 | 00089 | 18:30 | 20011225 |

FIG.8

| SHOP TABLE |||||||
|---|---|---|---|---|---|---|
| SHOP CODE | USER ID | GENRE CODE | LATITUDE | LONGITUDE | POINT SCORE | OPEN GROUP ID |
| mise2055135 | 00001 | 123 | 139.41.21.80 | 35.38.0.30 | 20 | G0001 |
| mise206677 | 00002 | 124 | 139.42.44.80 | 35.37.48.20 | 15 | G0001 |

FIG. 15

RESTAURANT ○○○ IS REGISTERED.

SELECT A GROUP
TO OPEN RESTAURANT ○○○.

☐ PERSONAL (NOT SHOWN)
■ TECHNICAL MANAGEMENT CLUB
☐ QUALITY GUARANTEE CLUB

64

NAVIGATION APPARATUS, NAVIGATION SYSTEM, METHOD THEREOF, PROGRAM THEREOF, AND RECORDING MEDIUM THEREOF

BACKGROUND OF THE INVENTION

1. Field of the Invention

The present invention relates to a data processing apparatus which processes report data, readably within a predetermined group, and a system thereof, a method thereof, a program thereof, and a recording medium which records the program.

2. Description of Related Art

There has been a conventional system having a widely known configuration in which a terminal computer is connected to each server, using an information network such as Internet, to attain data accumulated in servers. Examples of the configuration will be a site which provides map data, sites which provide traffic data, and weather data, and the like.

There has been also a known site which introduces a membership system so that only members can read data.

In conventional sites and even in the site introducing the membership system, however, data is disclosed widely and it is therefore impossible to share data among limited friends. Also in conventional sites, users merely use data provided from the managers of the sites, and differentiated handling of data is impossible. For example, friends cannot use a restaurant like a hiding place among them based on shared data. Hence, an operation of distributing data to be differentiated to each of friends must be carried out, so processing of data is complicated.

SUMMARY OF THE INVENTION

In view of the circumstances as described above, the present invention has as its main object to provide a data processing apparatus which achieves differentiated management of predetermined data and restrictive disclosure of data with ease, a system thereof, a method thereof, a program thereof, and a recording medium which records the program.

A data processing apparatus according to the present invention comprises: a personal data storage which stores personal data; a group attribute data attaining portion which attains group attribute data specific to a group linked to the personal data inputted from a terminal; a group identification data creation portion which creates group identification data in correspondence with the attained group attribute data, as the group attribute data attaining portion recognizes the group attribute data, and outputs the group identification data to the terminal; a group data storage which stores, as group data, the group attribute data attained by the group attribute data attaining portion and the group identification data created by the group identification data creation portion; an authentication portion which compares the group attribute data and group identification data inputted from the terminal, with the group data stored in the group data storage; a report data storage which stores report data inputted from the terminal, with report data being linked to the group attribute data; and a data disclosure portion which outputs only such report data among the report data stored in the report data storage that is linked to the group attribute data, to the terminal from which the group attribute data and group identification data are inputted, as the authentication portion recognizes that the group attribute data and group identification data inputted from the terminal are identical to the group data stored in the group data storage.

In this configuration, as group attribute data specific to a group linked to personal data inputted from a terminal by the group attribute data attaining portion is attained, the group identification data creation portion creates group identification data corresponding to the group attribute data and outputs the group identification data to the terminal, and both of the group attribute data and group identification data are stored as group data by the group data storage. Further, when group attribute data and group identification data are inputted from a terminal, both are compared with the stored group data by the authentication portion. If the group attribute data and group identification data are recognized to be identical to the stored group data, the data disclosure portion outputs only such report data among the report data linked to the group attribute data, inputted from the terminal and stored in the report data storage that is linked to the group attribute data recognized to be identical, to the terminal from which the group attribute data recognized to be identical is inputted. As a result, for example, data concerning a favorite shop can be shared as report data only among limited friends. The favorite shop can be used as if it is a hiding place or the like. Differentiated management and disclosure of data can thus be achieved easily.

Preferably in the data processing apparatus according to the present invention, the group identification data creation portion creates the group identification data in correspondence with the attained group attribute data and outputs the group identification data to the terminal, only in case where it is recognized that group attribute data different from the group attribute data stored in the group data storage is attained by the group attribute data attaining portion.

In this configuration, the group identification data creation portion creates the group identification data in correspondence with the attained group attribute data and outputs the group identification data to the terminal, only in case where it is recognized that group attribute data different from the group attribute data stored in the group data storage is attained by the group attribute data attaining portion. As a result, report data can be linked to different plural groups and can be shared only within the groups. Accordingly, applicability to general purposes and conveniences in use can be improved.

Preferably, the data processing apparatus according to the present invention further comprises a guide data output portion which outputs the group attribute data and group identification data to a predetermined terminal, together with guide data which invites participation in the group, based on a predetermined input from the terminal.

In this configuration, the guide data output portion outputs the group attribute data and group identification data to a predetermined terminal, together with guide data which invites participation in the group, based on a predetermined input from the terminal. As a result, for example, group attribute data and group identification data necessary to disclose report data are outputted to a terminal of a friend or the like, together with guide data which invites the friend or the like with whom the report data is desired to be shared, to participate in a group. Facilitated thus is management of groups for differentiated sharing of report data to be shared in each of the group.

Preferably, the data processing apparatus according to the present invention further comprises a participation/withdrawal processing portion which, based on personal data and an input determining participation in or withdrawal from a group from a terminal, links group attribute data corresponding to the group to the personal data inputted from the terminal, to prepare new group data, in case where the input determines participation, or releases a link of the personal data to group attribute data corresponding to the group, to prepare new group data, in case where the input determines withdrawal, and stores the new group data into the group data storage.

In this configuration, based on an input determining participation in a group, the participation/withdrawal processing portion links group attribute data corresponding to the group to the personal data inputted when inputting a determination on the participation, to prepare new group data, and stores the new group data into the group data storage. Alternatively, based on an input determining withdrawal from a group, the participation/withdrawal processing portion releases a link of the personal data inputted when inputting a determination on the withdrawal to group attribute data corresponding to the group, to prepare new group data, and stores the new group data into the group data storage. As a result, participation in or withdrawal from a group in which report data is shared is facilitated.

Preferably in the data processing apparatus according to the present invention, the participation/withdrawal processing portion recognizes the input determining the participation and accordingly gives a guide notifying that new participation has taken place, based on the personal data linked to the group attribute data of the group in which the participation has been determined.

In this configuration, the participation/withdrawal processing portion confirms the input determining the participation and accordingly gives a guide notifying that new participation has taken place, based on the personal data linked to the group attribute data of the group in which the participation has been determined. As a result, members forming a group to share report data are clear, and differentiated report data can be shared steadily only within a predetermined group.

Preferably, the data processing apparatus according to the present invention further comprises a map data storage which stores map data, wherein the report data attaining portion attains report data having location data specified by the map data.

In this configuration, the report data attained by the report data attaining portion is report data having location data specified by map data stored in the map data storage. As a result, all the report data that is shared in a predetermined group in a differentiated manner has location data specified on the basis of map data. Therefore, grasp and use of report data are easy, and loads to the report data storage which stores report data are reduced.

A data processing system according to the present invention comprises: the data processing apparatus described above; and a terminal connected to the data processing apparatus, allowing various data to be transmitted/received to/from the data processing apparatus.

In this configuration, a terminal is connected to the data processing apparatus which manages the report data shared only in a predetermined group according to any of claims 1 to 6, to transmit/receive various data. As a result, data communication is easy, for example, including setting of conditions for management of report data and differentiated disclosure, attaining of report data. Accordingly, conveniences are increased and use is enhanced easily.

A data processing method according to the present invention applies the foregoing data processing apparatus also according to the present invention to a data processing method in which report data is processed allowing the report data to be used within a predetermined group, by using a computer, the method comprising steps of: recognizing an input of group attribute data specific to a group linked to personal data; creating group identification data in correspondence with the group attribute data the input of which has been recognized, outputting the group identification data to a side of the input, and storing the group attribute data and group identification data as group data; and recognizing an input of group attribute data and group identification data, comparing the group attribute data and group identification data with the stored group data, and outputting only report data which is linked to the compared group attribute data, among report data inputted, linked to group attribute data.

As a result, it is possible to attain the same operations and effects as attained in the foregoing data processing apparatus according to the present invention.

A data processing program according to the present invention makes a computer execute the foregoing data processing method according the present invention.

In this configuration, the foregoing data processing method according to the present invention can be executed by a computer, for example, by installing the program into the computer with use of a general purpose computer. Accordingly, use of the present invention can be greatly promoted.

A recording medium according to the present invention records the data processing program according to the present invention, to be readable for a computer.

In this configuration, the data processing program for executing the data processing method according to the present invention is recorded on a recording medium. Therefore, handling of the data processing program is easy, so use of the present invention can be greatly promoted.

The computer mentioned herein is not limited to one single computer. For example, the configuration may include plural computers combined with each other like a network, an element such as a microcomputer, a circuit board mounting plural electronic components, and the like.

BRIEF DESCRIPTION OF THE DRAWINGS

FIG. 6 is a schematic view showing a data configuration of a personal list table having a table structure in which personal data is recorded as each one record in the embodiment;

FIG. 7 is a schematic view showing a data configuration of a group table having a table structure in which group data is recorded as each one record in the embodiment;

FIG. 8 is a schematic view showing a data configuration of a shop table having a table structure in which shop data is recorded as each one record in the embodiment;

FIG. 15 is an explanatory view showing a screen structure which invites setting for disclosing shop data of a shop for which a point card is registered to a group in the embodiment;

DETAILED DESCRIPTION OF PREFERRED EMBODIMENT(S)

Hereinafter, an embodiment of the present invention will be described with reference to the drawings.

[Configuration of Data Processing System]

Figure 1:
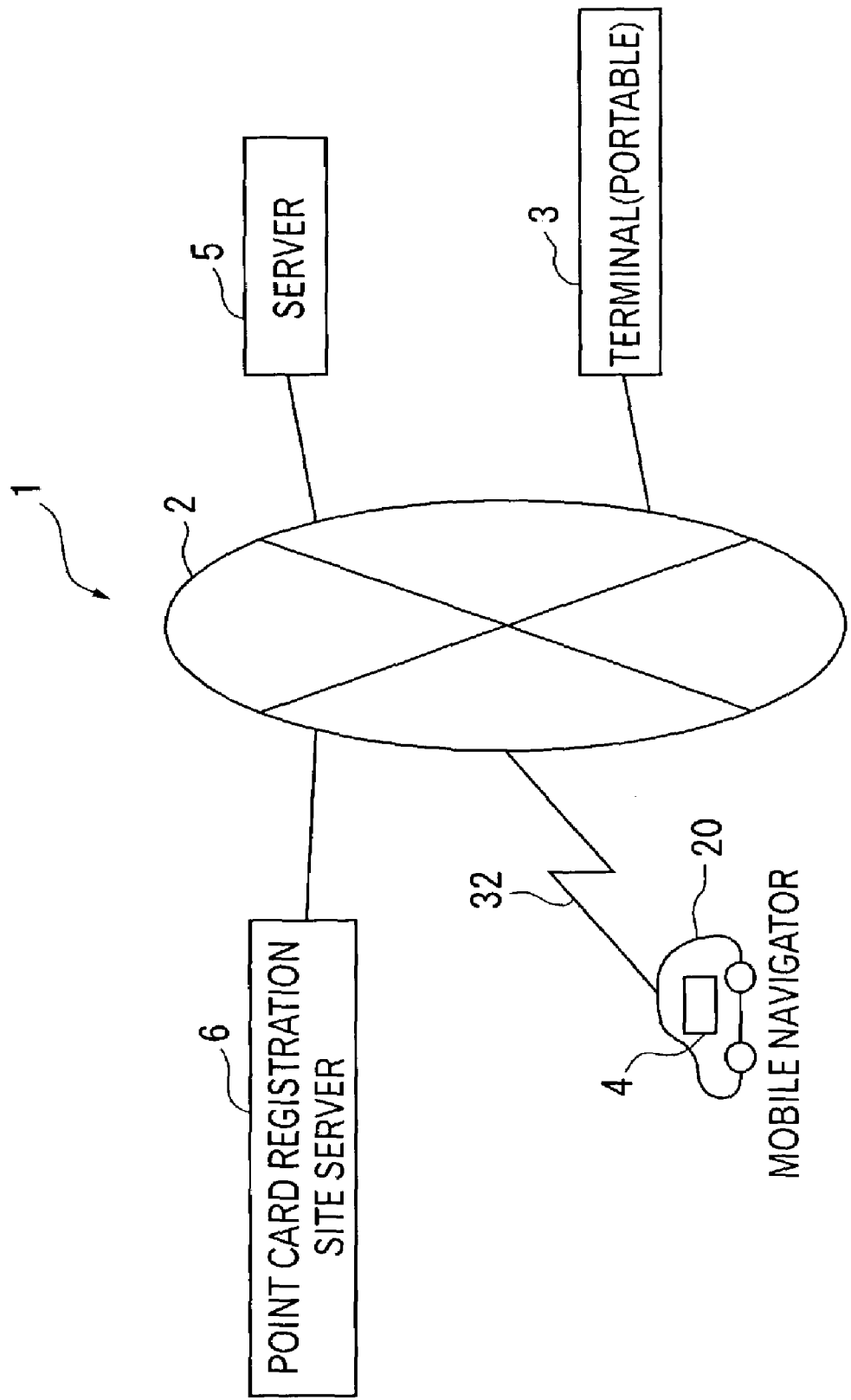
FIG. 1 is a block diagram showing a schematic configuration of an embodiment of the data processing system according to the data processing apparatus of the present invention.
Figure 2:
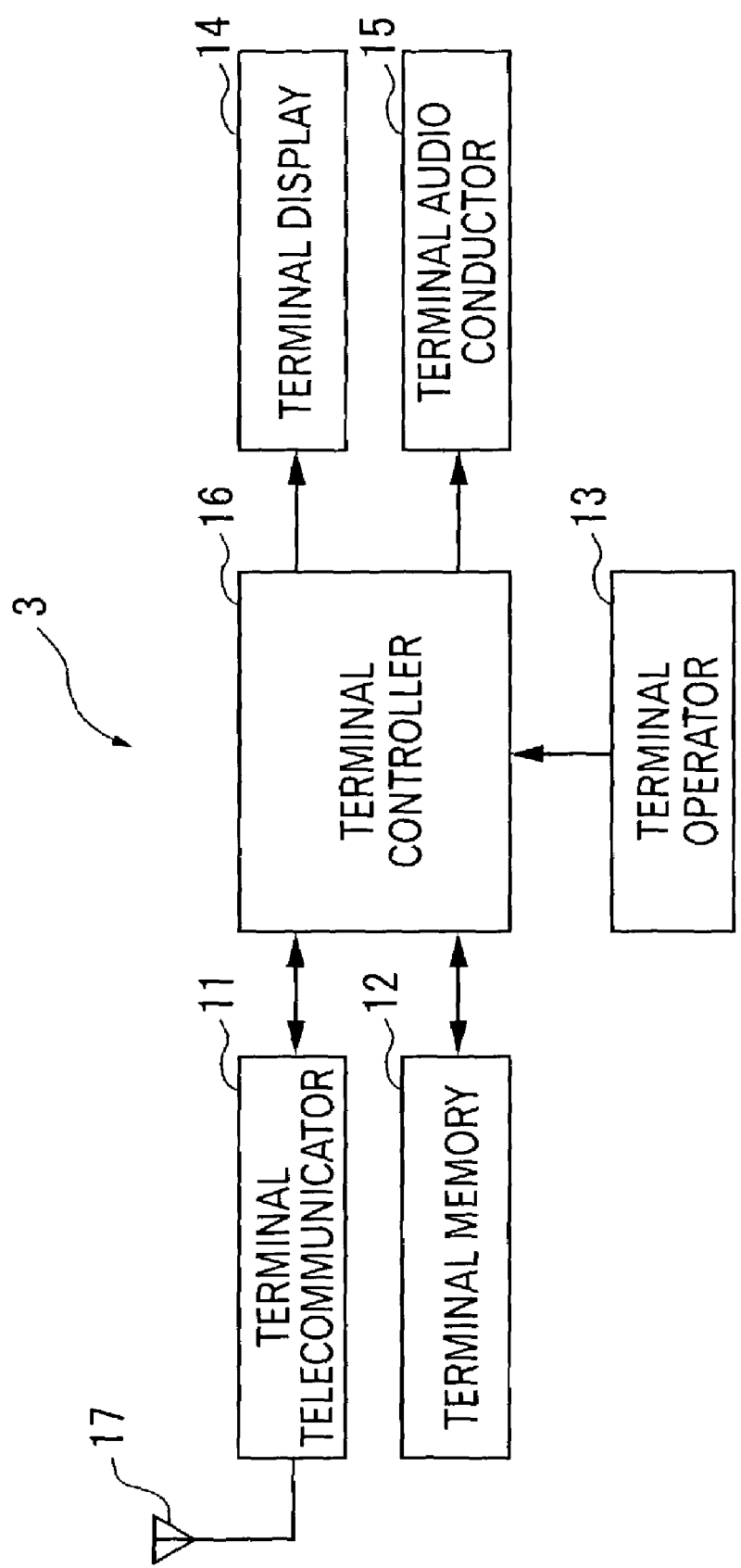
FIG. 2 is a block diagram showing a schematic configuration of a terminal in the embodiment.
Figure 3:
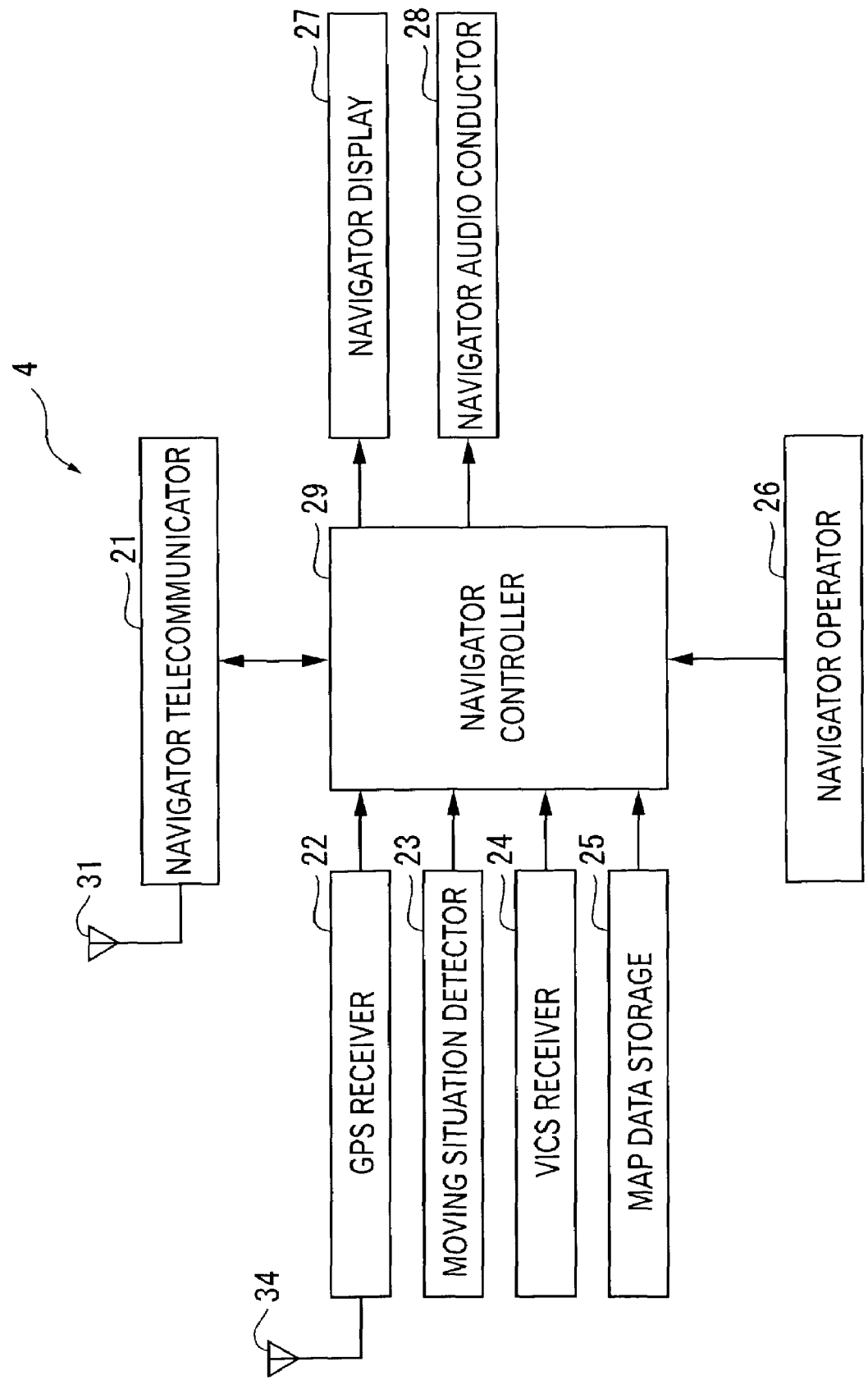
FIG. 3 is a block diagram showing a schematic configuration of a mobile navigator in the embodiment.
Figure 4:
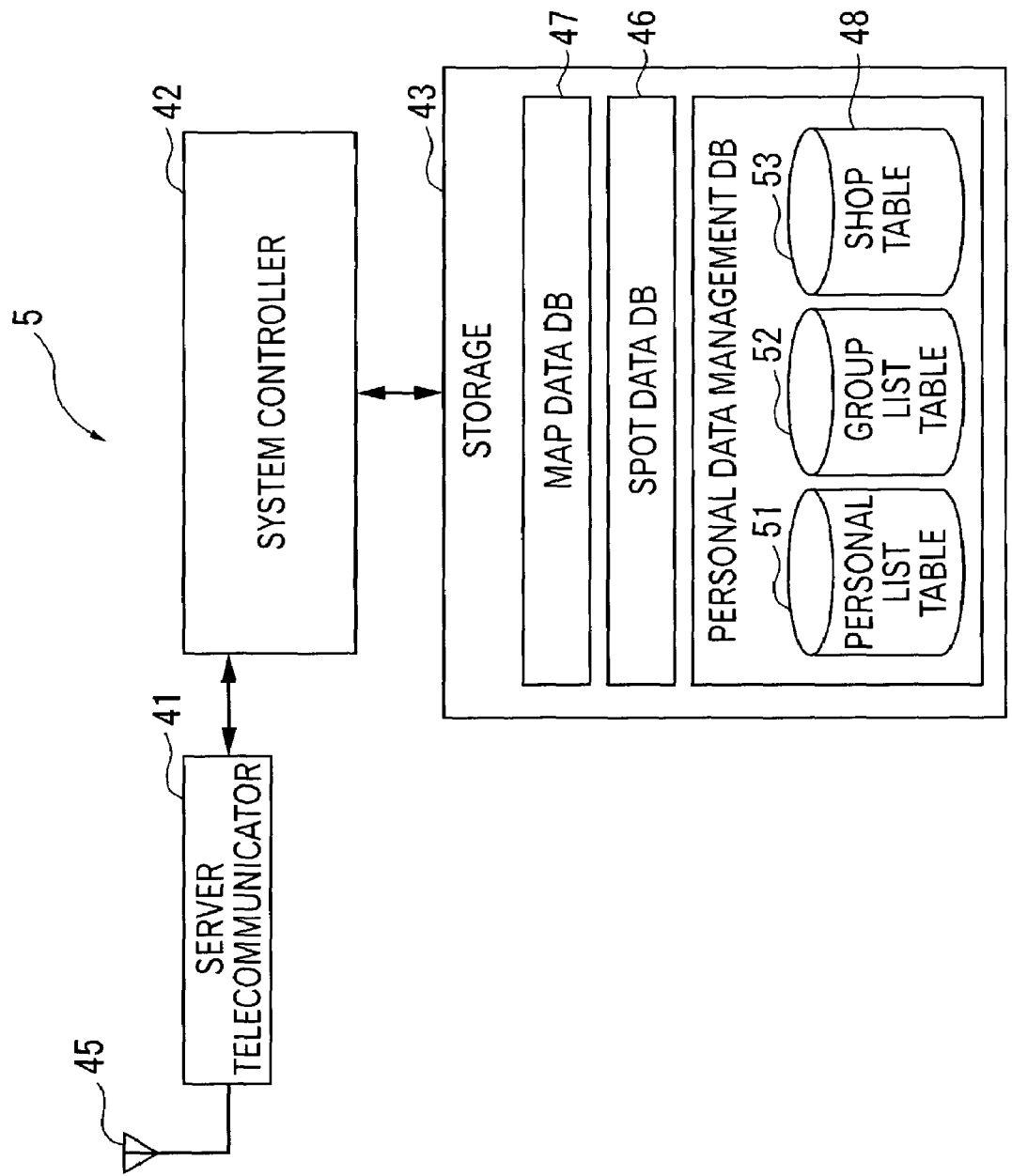
FIG. 4 is a block diagram showing a schematic configuration of a server in the embodiment.

FIG. 1 is a block diagram showing the schematic configuration of a data processing system to which the present invention is applied. FIG. 2 is a block diagram showing the schematic configuration of a terminal forming part of the data processing system. FIG. 3 is a block diagram showing the schematic configuration of a mobile navigator forming part of the data processing system. FIG. 4 is a block diagram showing the schematic configuration of a server forming part of the data processing system.

In FIG. 1, the data processing system 1 processes location data which allows location data based on map data concerning restaurants and recommended spots to be shared among predetermined friends. Further, this data processing system 1 includes a network 2, terminal 3, mobile navigator 4, server 5, and a registration site server 6.

The network 2 is configured as Internet or an intranet based on general purpose protocol such as TCP/IP (Transmission Control Protocol/Internet Protocol). This network 2 is connected to the terminal 3, mobile navigator 4, server 5, and registration site server 6.

The terminal 3 is a portable terminal such as a general-purpose computer including a computer body, input device, and display device, a mobile phone or PHS (Personal Handyphone System), or the like. Installed in the terminal 3 are browser software, electronic mail software, and the like to read homepages on Internet as the network 2. Thus, various data can be transmitted/received via the network 2. Further, as exemplified in FIG. 2, the terminal 3 has a terminal telecommunicator 11, terminal memory 12, terminal operator 13, a terminal display 14, terminal audio conductor 15, and terminal controller 16 which constructs the computer body.

The terminal telecommunicator 11 has a terminal antenna 17 and transmits/receives signals to/from the network 2. The terminal telecommunicator 11 is connected to the terminal controller 16. The telecommunicator outputs a received signal to the terminal controller 16 and also outputs a signal outputted from the terminal controller 16 to the network 2.

The terminal memory 12 stores data outputted from the terminal controller 16, with the data kept readable. For example, the terminal memory may be a RAM (Random Access Memory) or a drive such as hard disk, optical disk, or magnetic disk which records data on a recording medium.

The terminal operator 13 includes various operation keys not shown but like a keyboard to operate the terminal 3 appropriately. By input from these operation keys, the terminal operator 13 properly outputs predetermined signals to the terminal controller 16 to set and input various conditions such as contents of operation of the terminal 3. The configuration of the terminal controller 13 may be modified such that various conditions can be set and inputted not only by input from operation keys but also by input from a touch panel which may be provided over the terminal display 14 or input of voice or the like.

The terminal display 14 is controlled by the terminal controller 16 and properly displays image data among data outputted from the terminal controller 16. Specifically, it is possible to use a liquid crystal display, organic EL (Electroluminescence) display, PDP (Plasma Display Panel), CRT (Cathode-Ray Tube) or the like.

The terminal audio conductor 15 has a sound generation portion not shown, such as a speaker or the like. The terminal audio conductor 15 is controlled by the terminal controller 16, and outputs audio data among data outputted from the terminal controller 16, in form of a sound through the sound generation portion.

The terminal controller 16 has various input/output ports not shown. For example, the ports are a data telecommunication port connected to the terminal telecommunicator 11, a memory connection port connected to the terminal memory 12, a key input port connected to the terminal operator 13, a display control port connected to the terminal display 14, an audio control port connected to the terminal audio conductor 15, and the like. Further, the terminal controller 16 processes data transmitted/received to/from the network 2 through the terminal telecommunicator 11, by a program extended on an installed OS (Operating System) which controls operation of the entire terminal 3.

Meanwhile, as shown in FIG. 1, the mobile navigator 4 is mounted on a vehicle 20 like a passenger car as a moving object. The mobile navigator 4 operates by a power supplied from a battery not shown but mounted on the vehicle 20. The mobile navigator 4 includes a navigator telecommunicator 21, GPS (Global Positioning System) receiver 22, moving situation detector 23, VICS (Vehicle Information and Communication System) receiver 24, map data storage 25, navigator operator 26, navigator display 27, navigator audio conductor 28, and navigator controller 29.

The navigator telecommunicator 21 has a navigator antenna 31 and transmits/receives signals such as radio waves, electromagnetic waves, light waves, and sound waves, to/from the network 2 through wireless media 32. The navigator telecommunicator 21 is connected to the navigator controller 29. The telecommunicator 21 outputs received signals to the navigator controller 29 and also outputs signals from the navigator controller 29 to the network 2.

The GPS receiver 22 is connected to a GPS antenna 34. The GPS receiver 22 receives navigation waves outputted from a GPS satellite not shown, which is an artificial satellite, through the GPS antenna 34. The GPS receiver 22 calculates pseudo-coordinate value of a current position, based on a received signal. The receiver 22 further outputs the pseudo-coordinate value to the navigator controller 29.

The moving situation detector 23 has a velocity sensor not shown but provided on the vehicle 20, an azimuth sensor, acceleration sensor, and the like to detect a situation of the moving vehicle 20. The moving situation detector 23 thus detects driving states of the vehicle 20 by those sensors, and outputs the states as various driving situation data to the navigator controller 29.

The VICS receiver 24 has a VICS antenna not shown and attains traffic data via the VICS antenna. More specifically, the VICS receiver 24 obtains traffic data concerning traffic jams, traffic accidents, construction works, and traffic regulations from the Vehicle Information and Communication System (VICS), for example, via a beacon or FM multiplex broadcasting. Alternatively, the traffic data may be obtained via the network 2.

The map data storage 25 stores map data obtained from the server 5 through the network 2 by the navigator telecommunicator 21. Used as the map data storage 25 may be a RAM (Random Access Memory) or a drive which records data on a recording medium such as a hard disk, optical disk, or a magnetic disk.

The navigator operator 26 includes various operation keys not shown, to operate appropriately the mobile navigator 4, for example, by a command for displaying a driving state of the vehicle 20. By input through these operation keys, the navigator operator 26 outputs properly predetermined signals to the navigator controller 29 to set and input various conditions such as contents of operation of the mobile navigator 4 and settings of a destination. The configuration of the navigator controller 26 may be modified such that various conditions can be set and inputted not only by input through the operation keys but also by input through a touch panel which may be provided over the navigator display 27 or input of voice or the like.

The navigator display 27 is controlled by the navigator controller 29 and properly displays image data among data outputted from the navigator controller 29. Specifically, like the terminal display 14 in the terminal 3, it is possible to use a liquid crystal display, organic EL display, PDP, CRT, or the like.

Like the terminal audio conductor 15 in the terminal 3, the navigator audio conductor 28 has a sound generation portion not shown, such as a speaker or the like. The navigator audio conductor 28 is controlled by the navigator controller 29, and outputs audio data among data outputted from the navigator controller 29, in form of a sound from the sound generation portion.

The navigator controller 29 has various input/output ports not shown. For example, the ports are a GPS receiver port connected to the GPS receiver 22, a sensor connection port connected to various sensors, a VICS data receiver port connected to the VICS receiver 24, a key input port connected to the navigator operator 26, a display control port connected to the navigator display 27, an audio control port connected to the navigator audio conductor 28, and the like. Further, the navigator controller 29 executes various controls by a program extended on the OS which controls operation of the entire mobile navigator 4.

The server 5 is constituted, for example, as a WWW (World Wide Web) server connected to the network 2. The server 5 includes a server telecommunicator 41, system controller 42, and storage 43, as shown in FIG. 4.

The server telecommunicator 41 has a server antenna 45 and transmits/receives signals to/from the network 2. The server telecommunicator 41 is connected to the system controller 42. This telecommunicator 41 outputs a received signal to the system controller 42, and also outputs a signal outputted from the system controller 42 to the network 2.

The system controller 42 executes various programs to make various processings on data to be transmitted/received to/from the network 2 through the server telecommunicator 41. To be specific, the system controller 42 includes a group attribute data attaining portion, a group identification data creation portion, an authentication portion, a data disclosure portion, a guide data output portion, and a participation/withdrawal processing portion not shown but as programs extended on the OS. Also, the system controller 42 is connected to the storage 43. The system controller 42 outputs attained data to the storage 43 to store the data therein. In addition, the system controller 42 appropriately attains data stored in the storage 43 and outputs it to the network 2.

The group attribute data attaining portion of the system controller 42 attains group attribute data set and inputted by the terminal 3 and received via the network 2 by the server telecommunicator 41. The group attribute data thus attained is outputted to the storage 43.

The group identification data creation portion of the system controller 42 recognizes that group attribute data has been obtained by the group attribute data attaining portion. The group identification data creation portion then creates specific group identification data corresponding to the attained group attribute data. The created group identification data is outputted to a terminal to which the group attribute data has been set and inputted through the network 2 by the server telecommunicator 41.

The authentication portion of the system controller 42 collates the group attribute data and group identification data, which have been set and inputted by a terminal and have been attained by the server telecommunicator 41 via the network 2, with group data stored in the storage 43.

If the group attribute data and group identification data attained from the terminal 3 are recognized to be equal to pre-stored group data in the storage 43 by the authentication portion, the data disclosure portion of the system controller 42 outputs report data stored in the storage 43, i.e., allows the report data to be readable in accordance with predetermined input operation on the terminal 3.

The guidance data output portion of the system controller 42 recognizes a predetermined setting input from the terminal 3, and then outputs or provides, to a predetermined terminal 3, group attribute data and group identification data together with guidance data which invites participation in the group.

The participation/withdrawal processing portion of the system controller 42 recognizes a signal from the terminal 3, which expresses a determination on participation in a group or withdrawal from a group. The participation/withdrawal processing portion then updates the group data. That is, if the participation/withdrawal processing portion recognizes a signal expressing a determination on participation, group data is updated into new group data by linking the group attribute data corresponding to the group in which the participation is intended, with personal data inputted together with the signal expressing the determination. Alternatively, if the participation/withdrawal processing portion recognizes a signal expressing a determination on withdrawal, group data is updated into new group data by unlinking the personal data recognized together with the signal expressing a determination on withdrawal, among personal data linked with the group attribute data corresponding to the group from which the withdrawal is intended. Note that updated new group data is outputted to and stored into the storage 43.

The storage 43 has a hard disk, optical disk, or magnetic disk, for example, to store data outputted from the system controller 42. Further, the storage 43 is provided with a spot data database 46, map data database 47 as a map data storage, and personal data management database 48.

The spot data database 46 is constituted as a database having a table structure in which spot data outputted from the system controller 42 and including name data of a shop, class data, content data of the shop, geographical position data, and the like is recorded as each one record. Note that the spot data database 46 can not only store spot data attained via the network 2 but also spot data set and inputted by an input portion not shown but connected to the system controller 42.

Figure 5:
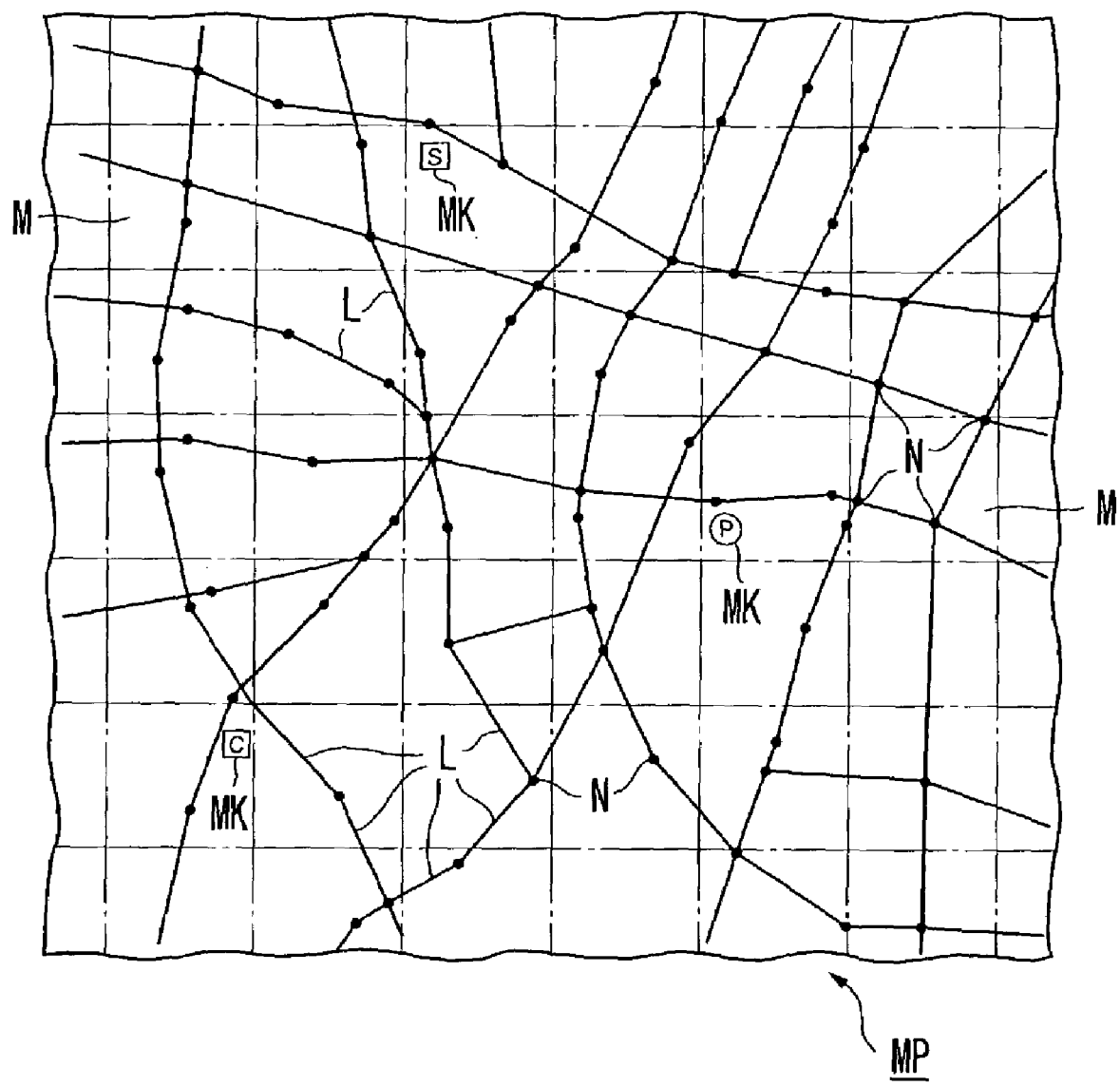
FIG. 5 is a schematic view showing a data configuration of map data in the embodiment.

The map data database 47 stores map data. The map data has a data configuration as shown in FIG. 5. FIG. 5 is a schematic view showing the data configuration of the map data.

In FIG. 5, MP is map data and has plural pieces of mesh data M respectively assigned by specific numerals. These pieces of mesh data M each has edges of a preset length scaled down from actual geographical scales so as to comply with the scales of maps. Further, the map data MP is constituted by continuously connecting the plural pieces of mesh data M in longitudinal and lateral directions.

Further, roads are constituted on the map data MP by continuously connecting nodes N and links L each of which is a segment connecting two of the nodes N (e.g., black dots in FIG. 5). The nodes N correspond to connection points such as intersections, corner points, branch points, junction points, and the like on roads. Data concerning the nodes N includes position data of the position of each node N, which consists of latitude and longitude, specific numerals assigned respectively to the nodes N, and branch data expressing whether or not each node N is a branch position such as an intersection or a branch point where plural links cross each other. Data concerning the links L includes specific numerals (hereinafter called link IDs) respectively assigned to the links L, and node data expressing the specific numerals of two nodes N which are connected by each link L.

The map data MP is provided with famous spot data including marks which indicates famous places and buildings and position data expressing latitude and longitude of the places and buildings. The map data MP is further provided with title data including names of crossings and the like.

The map data MP includes plural pieces of map data MP which show one same area in different scales. Various data including the node data, link ID, famous spot data, and title data as described above is provided for every one of the pieces of map data MP having different scales. The map data MP can be updated by adding new road data or the like via an input portion not shown but connected to the system controller 42.

The personal data management database 48 appropriately stores shop data as personal data, group data, and report data. That is, the personal data management database 48 includes a personal list table 51 as a personal data storage, a group list table 52 as a group data storage, and a shop table 53 as a report data storage.

The personal list table 51 stores personal data, for example, as shown in FIG. 6. To be specific, the personal list table 51 is configured as a database having a table structure in which user ID (Identification) data, name data, address data, E-mail address data, and point data of attained points in the data processing system 1 are recorded as each one record.

The group list table 52 stores group data, for example, as shown in FIG. 7. Specifically, the group list table 52 is constituted as a database having a table structure in which group ID data as group identification data, password data also as group identification data, group name data as group attribute data, creator data, member ID data, registration time data, registration date data, and the like are recorded as each one record. The creator data is linked with the personal data, as shown in FIG. 7, to link the personal data with the group data.

The shop table 53 stores shop data, for example, as shown in FIG. 8. To be specific, the shop table 53 is configured as a database having a table structure in which shop code data, user ID data, shop genre data, position data including longitude data and latitude data of a shop as location data, point data of attained points, and group ID data of a group to which data is opened (the open group ID in FIG. 8) are recorded as each one record.

Meanwhile, the registration site server 6 manages data concerning users who registered in a so-called point system in which points having added value are given from shops described later, and concerning the points. The registration site server 6, for example, is a server managed by a shop. Like the server 5, the registration site server 6 has a controller not shown, which controls the entire server and transmits/receives data concerning points to/from the network 2, and a point database also not shown, which stores data concerning transmitted/received data concerning points.

[Operation of Data Processing System]

Operation of the data processing system 1 described above will now be described with reference to the drawings.

(Registration of a System Member)

Figure 9:
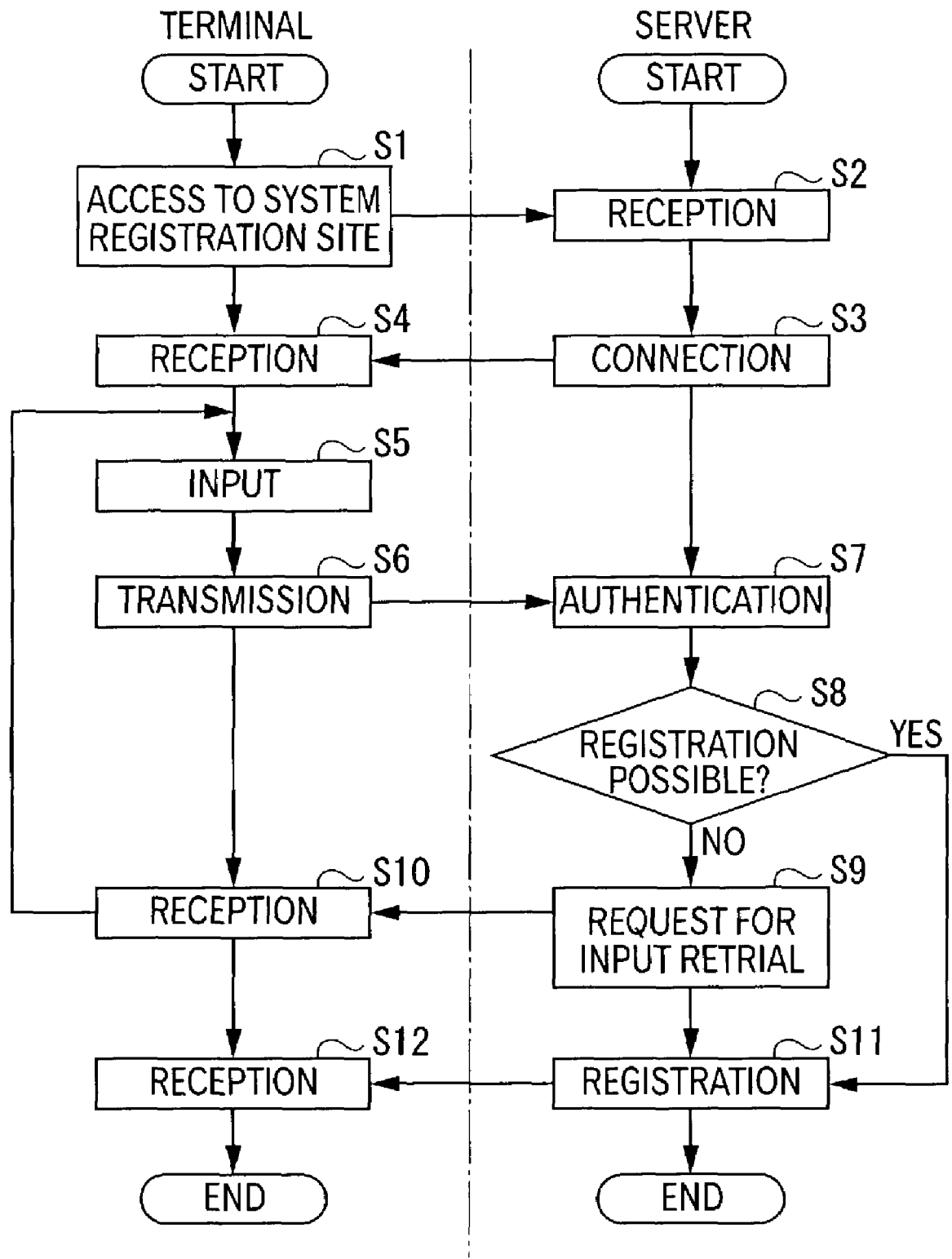
FIG. 9 is a flowchart showing an operation of registering a system member in the embodiment.

Firstly, description will be made of an operation of member registration to use the data processing system 1 with reference to FIG. 9. FIG. 9 is a flowchart showing the operation of registering a system member.

To use the data processing system 1, an applicant for use of the system accesses a system registration-site by a terminal 3 or mobile navigator 4 (step S1). Specifically, the applicant operates the terminal operator 13 of the terminal 3 or the navigator operator 26 of the mobile navigator 4, to connect to the server 5 via the network 2. The applicant then selects the system registration-site from a main site of the data processing system 1 and requests a connection.

The system controller 42 of the server 5 recognizes the request for connection to the system registration-site from the applicant, by the server telecommunicator 41 (step S2). The system controller 42 makes the connection and transmits a guide which invites the applicant to input predetermined requirements (step S3). The guide transmitted in step S3 is received by the terminal 3 or the mobile navigator 4 (step S4). The applicant then inputs the predetermined requirements in accordance with the guide (step S5), and transmits them to the server 5 (step S6).

Data of the requirements transmitted in step S6 is received by the server 5 (step S7). The system controller 42 determines whether the data of the requirements are acceptable or not (step S8). In step S8, if the data of the inputted requirements is determined to be not acceptable, the system controller 42 transmits a guide which invites retrial of the input (step S9). The guide for the retrial of the input is received by the terminal 3 or the mobile navigator 4 (step S10). The procedure returns to step S5. The applicant then retry the input in accordance with the guide.

In step S8, if the data of the inputted requirements is determined to be acceptable, the system controller 42 carries out registration by a processing of storing personal data as one record consisting of the requirements, into the personal list table 51 in the personal data management database 48, for example, as shown in FIG. 6 (step S11). Then, the system controller 42 transmits data about a guide notifying the registration, user ID, and personal password, to the terminal 3 or mobile navigator 4. The terminal 3 or mobile navigator 4 receives the guide notifying completion of the registration, the user ID, and the personal password (step S12). The processing of registering a system member is thus finished.

(Registration of New Group)

Figure 10:
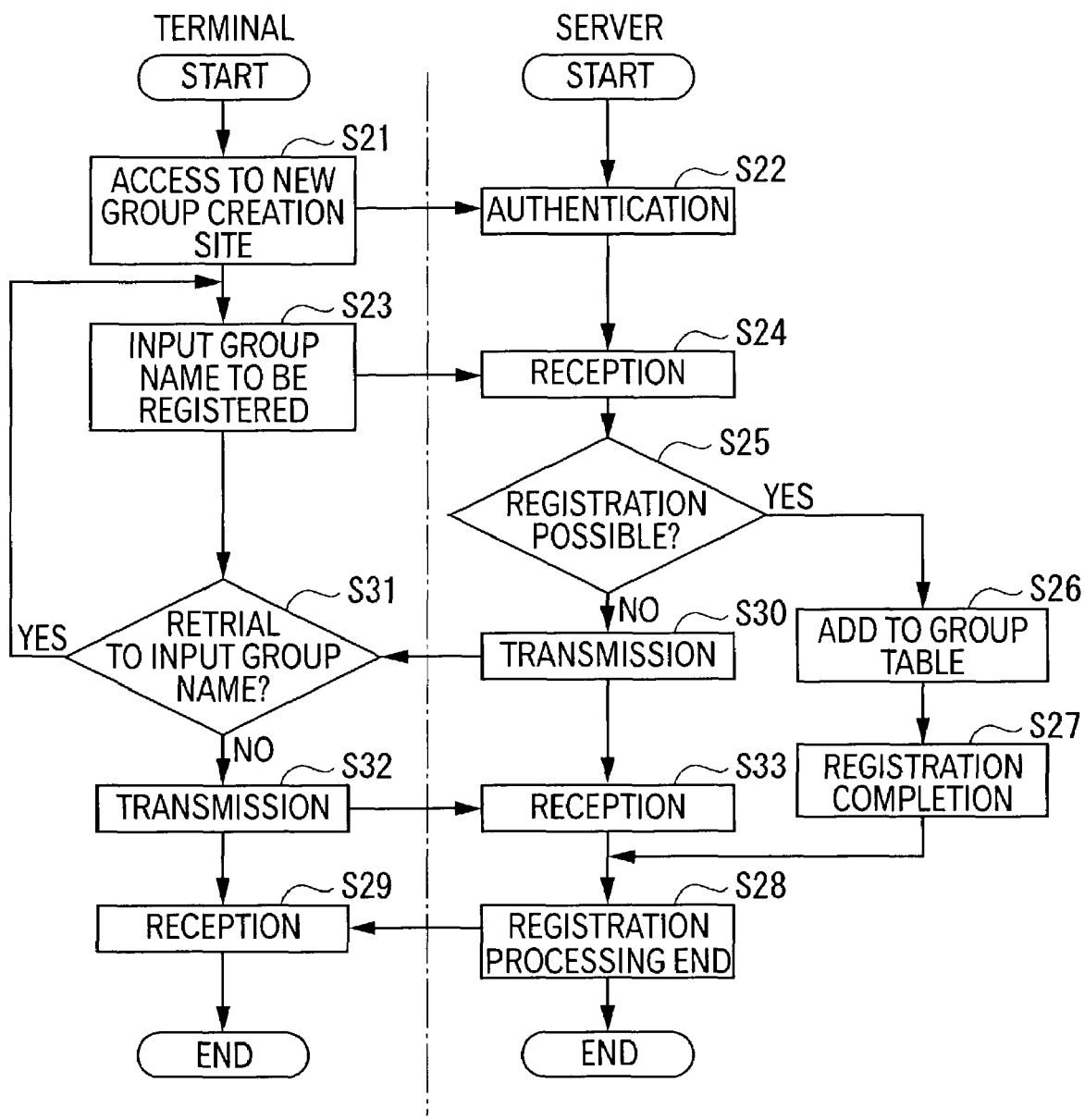
FIG. 10 is a flowchart showing an operation of registering a new group in the embodiment.

Next description will be made of an operation of registering a group in which users as members of the data processing system 1 share data in common, with reference to FIG. 10. FIG. 10 is a flowchart showing an operation of registering a group.

Firstly, a user accesses a site for creating a new group by the terminal 3 or mobile navigator 4 (step S21). Specifically, the user operates the terminal operator 13 of the terminal 3 or the navigator operator 26 of the mobile navigator 4, to connect to the server 5 via the network 2 and further to the main site of the data processing system 1. The user then selects the site for creating a new group from the main site and requests a connection.

The system controller 42 of the server 5 recognizes the request for connection to the site for creating a new group from the user, by the server telecommunicator 41. The system controller 42 then transmits a guide which invites the user to input a user ID and personal password, to confirm membership of the user in the data processing system 1. Based on the guide transmitted, the user then inputs the user ID and personal password which the user have attained previously by the processing shown in the flowchart in FIG. 9.

Based on the input of the user ID and personal password, the system controller 42 of the server 5 executes a comparison with personal data stored in the personal list table 51 in the personal data management database 48. Further, the system controller 42 authenticates the user's membership (step S22), and then executes a control to connect the terminal 3 or the mobile navigator 4 to the site for creating a new group in the server 5.

In accordance with instruction from the accessed site for creating a new group, the user operates the terminal operator 13 or the navigator operator 26, to input the name of a group to be registered (step S23). The name data of the inputted group is outputted from the terminal telecommunicator of the terminal 3 and is received by the server telecommunicator 41 of the server 5 via the network 2.

In step S24, the name data of the group is compared with group data stored in the group list table 52 in the personal data management database 48 by the system controller 42. The system controller 42 determines whether a same name as the new group has already been stored or not (step S25).

Further, if it is determined in step S25 that no group having the same name has been registered and the new group name can be registered, the system controller 42 automatically creates a group ID and group password for the group. Then, the system controller 42 executes a processing of adding, as one record, the group name data, group ID data, and group password, together with the user ID data of the user who created the group, and the time data and date data expressing when the group was created, to the group list table 52 of the personal data management database 48 (step S26).

Upon completion of the registration by the processing in step S26 (step S27), the system controller 42 transmits a guide notifying the completion of the registration processing and including data expressing the registered group name, group password, and URL (Universal Resource Locator) of a site for adding members, to the terminal 3 or the mobile navigator 4 (step S28). Registration completion data thus transmitted is received by the terminal 3 or the mobile navigator 4 (step S29), and the processing of creating a new group is finished.

In step S25, if the system controller 42 determines that a group having the same name as the new group has already been registered, the system controller 42 transmits a guide notifying that the inputted name has already been registered and a different name should be inputted, to the terminal 3 or the mobile navigator 4 (step S30). If the user retries the input in accordance with the guide in step S30 which invites the user to input a different group name (step S31), the procedure returns to the step S23.

Alternatively, if the input is not retried in step S31, the user does not input a different group name and notifies the server 5 of cancellation of the registration of a new group (step S32). A signal which notifies the cancellation of the retrial is received by the system controller 42 (step S33), the system controller 42 terminates the registration processing for creating a new group, and outputs a guide notifying the cancellation of the processing of registering a new group, to the terminal 3 or mobile navigator 4. The processing of registering a new group thus ends.

(Guide for Participation in Group)

Figure 11:
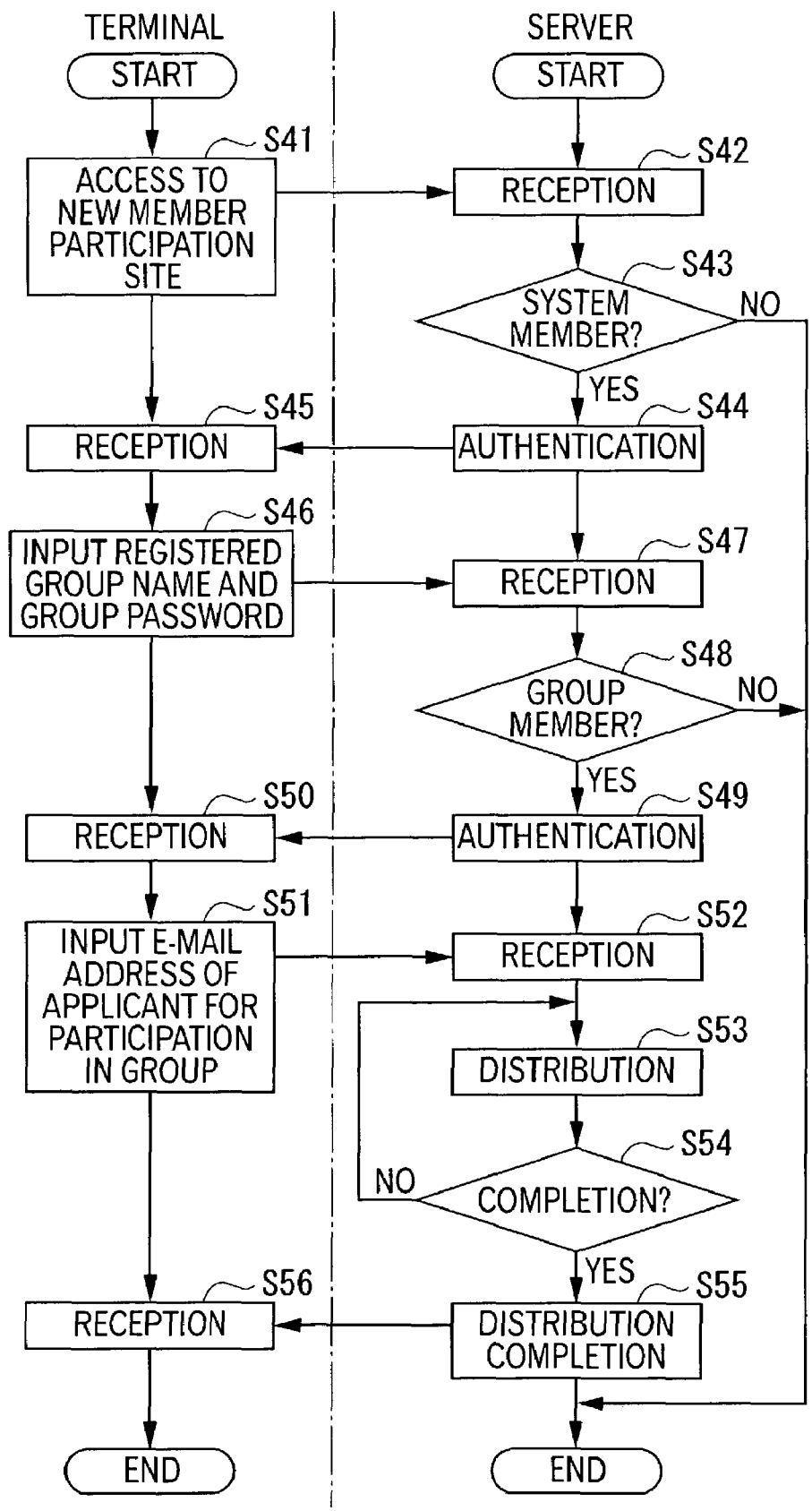
FIG. 11 is a flowchart showing an operation for guiding participation of a member in a group in the embodiment.

An operation of guiding a specific person to participation in a registered group will now be described with reference to FIG. 11. FIG. 11 is a flowchart showing an operation of adding a member to a group.

Firstly, an organizer or member of a group accesses a new-member participation site by the terminal 3 or mobile navigator 4 (step S41). Specifically, the organizer or member of the group operates the terminal operator 13 of the terminal 3 or the navigator operator 26 of the mobile navigator 4, to connect to the server 5 via the network 2 and further to the main site of the data processing system 1. The organizer or member then selects the new member participation site in the main site and requests a connection thereto.

The system controller 42 of the server 5 recognizes the request for connection to the new member participation site, by the server telecommunicator 41. The system controller 42 then transmits a guide which invites input of a user ID and personal password, to confirm membership of the data processing system 1. Based on the guide transmitted, the organizer or member then inputs the user ID and personal password which the user have attained previously by the processing shown in the flowchart in FIG. 9.

Upon receipt of the user ID and personal password inputted (step S42), the system controller 42 of the server 5 compares the ID and password with personal data stored in the personal list table 51 in the personal data management database 48, to determine whether the organizer or member is a system member or not (step S43). If the organizer or member is not determined to be a system member, the system controller 42 cancels access to the new member participation site and the processing ends. Alternatively, the processing may be arranged so as to give a guide which invites retrial to input a correct user ID and a correct personal password. If retried input fails a predetermined number of times or if cancellation of access is inputted, the access to the new member participation site may be cancelled and the processing may then be terminated.

If it is determined in step S43 that the organizer or member is a system member, the system controller 42 transmits a guide notifying that the user ID and personal password inputted have been authenticated, to the terminal 3 or mobile navigator 4. The system controller 42 then executes a control to connect the terminal 3 or the mobile navigator 4 to the site for creating a new group in the server 5 (step S44). The organizer or member of the group receives and checks the guide notifying the authentication (step S45), and then inputs the group name and group password which have been previously attained (step S46).

In step S48, if the group name and group password are correct and the organizer or member is determined to be a group member, a guide notifying authentication of the group name and group password is transmitted to the terminal 3 or mobile navigator 4 (step S49). Further, the organizer or member receives the guide notifying the authentication from the server 5, and checks the guide (step S50). Then, in accordance with the guide, the organizer or member inputs an E-mail address of a user to whom the group should be introduced (step S51).

The server 5 receives the mail address inputted in step S51 (step S52), the system controller 42 distributes by E-mail a guide which invites participation in the group based on the inputted mail address (step S53). The guide which invites participation in the group may include, for example, the group name, group password, and data of URL designating a group site which contains data readable only for the members of the group.

Whether or not the distribution of the guide inviting participation in the group has been completed in step S53 is determined (step S54). If completion of the distribution processing is recognized, a guide notifying the completion is transmitted to the terminal 3 or mobile navigator 4 (step S55). The terminal 3 or mobile navigator 4 receives the guide notifying the completion of the distribution processing (step S56), and the processing of guiding participation in a group ends thereby.

(Participation of New Member in Group)

Figure 12:
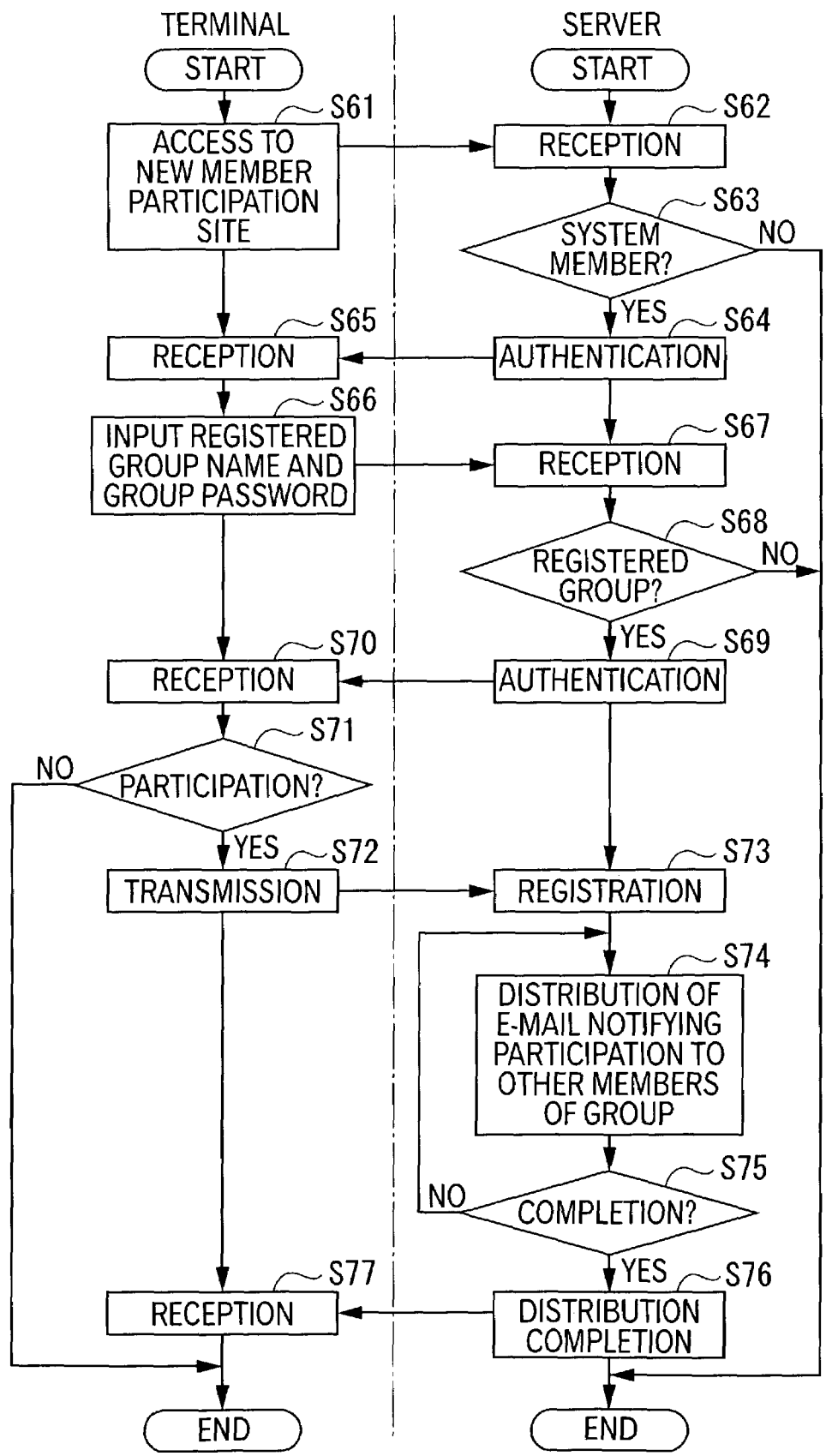
FIG. 12 is a flowchart showing an operation for newly participating in a group in the embodiment.

An operation of participation of a new member in a registered group will now be described with reference to the drawings. FIG. 12 is a flowchart showing the operation of participation of a new member in a group.

Firstly, a user who is a system member uses the terminal 3 or mobile navigator 4 to access the new member participation site, based on the guide for participation in a group, which is attained by the operation shown in the flowchart in FIG. 11, or based on a guide attained from the organizer or a member of the group (step S61). Specifically, the user operates the terminal operator 13 of the terminal 3 or the navigator operator 26 of the mobile navigator 4, to connect to the server 5 via the network 2 and further to the main site of the data processing system 1. The user then selects the new member participation site in the main site, and requests a connection thereto.

The system controller 42 of the server 5 recognizes the request for connection to the new member participation site, by the server telecommunicator 41. The system controller 42 then transmits a guide which invites input of a user ID and personal password, to confirm membership of the data processing system 1. Based on the guide transmitted, the user then inputs the user ID and personal password which the user have attained previously. Upon receipt of the user ID and personal password inputted (step S62), the system controller 42 compares the ID and password with personal data stored in the personal list table 51 in the personal data management database 48, to determine whether the user is a system member or not (step S63). If the user is not determined to be a system member, the system controller 42 cancels access to the new member participation site and the processing ends. Alternatively, the processing may be arranged so as to give a guide which invites retrial to input a correct user ID and a correct personal password. If retried input fails a predetermined number of times or if cancellation of access is inputted from the terminal 3 or mobile navigator 4, the access to the new member participation site may be cancelled and the processing may then be terminated.

If it is determined in step S63 that the user is a system member, the system controller 42 transmits a guide notifying that the user ID and personal password inputted have been authenticated, to the terminal 3 or mobile navigator 4. The system controller 42 then executes a control to connect the terminal 3 or the mobile navigator 4 to the site for creating a new group in the server 5 (step S64). The user of the group receives and checks the guide notifying the authentication (step S65), and then inputs the group name and group password which have been attained previously by an E-mail guiding participation or directly from another member (step S66).

The server 5 receives the group name and group password inputted from the terminal 3 or mobile navigator 4 in step S66 (step S67). Then, the system controller 42 compares the group name and group password with group data stored in the group list table 52 in the personal data management database 48, to determine whether the group name and group password belong to a registered group or not (step S68). That is, whether or not the inputted group name and group password are correct or not is determined. If the group name or the group password or both are incorrect and are not determined to belong to any registered group, access to the new member participation site is cancelled and the processing ends. Alternatively, the processing may be arranged so as to give a guide which invites retrial to input a correct group name and a correct group password. If retried input fails a predetermined number of times or if cancellation of access is inputted from the terminal 3 or the mobile navigator 4, the access to the new member participation site may be cancelled and the processing may then be terminated.

In step S68, if the group name and group password are correct and the user is determined to be a group member, a guide notifying authentication of the group name and group password and inquiring whether the user participates in the group is transmitted to the terminal 3 or mobile navigator 4 (step S69). Further, the user receives and checks the guide notifying the authentication and inquiring the participation from the server 5 (step S70). Then, in accordance with the guide, the user inputs whether the user participates in the group or not (step S71).

Further, the system controller 42 distributes a guide reporting the participation of a new member, to other members in the group in which the new member has participated (step S74). Specifically, based on the group data recorded on the group list table 52 in the personal data management database 48, the system controller 42 searches for member ID data of the same group. Referring to the member ID data thus searched for, the system controller 42 distributes the guide reporting the participation of the new member, based on E-mail address data which forms part of the personal data stored in the personal list table 51.

After completion of the distribution of the guide by E-mail (step S75), the system controller 42 transmits a guide notifying that the processing of registering the new member has been finished and the guide has been distributed to other members in the group, to the terminal 3 or the mobile navigator 4 (step S76). The transmitted guide is received by the terminal 3 or the mobile navigator 4 (step S77), and the processing of participation of a mew member ends.

Although a guide reporting participation of a new member is distributed to other members in the group by E-mail in step S74, it need not always be distributed. That is, after a new member is registered in step S73, a guide notifying the registration of the new member may be transmitted to the terminal 3 or the mobile navigator 4. Further in step S77, the terminal 3 or the mobile navigator 4 may receive the guide, and the processing may thereby be terminated.

(Point Management for System Members)

Figure 13:
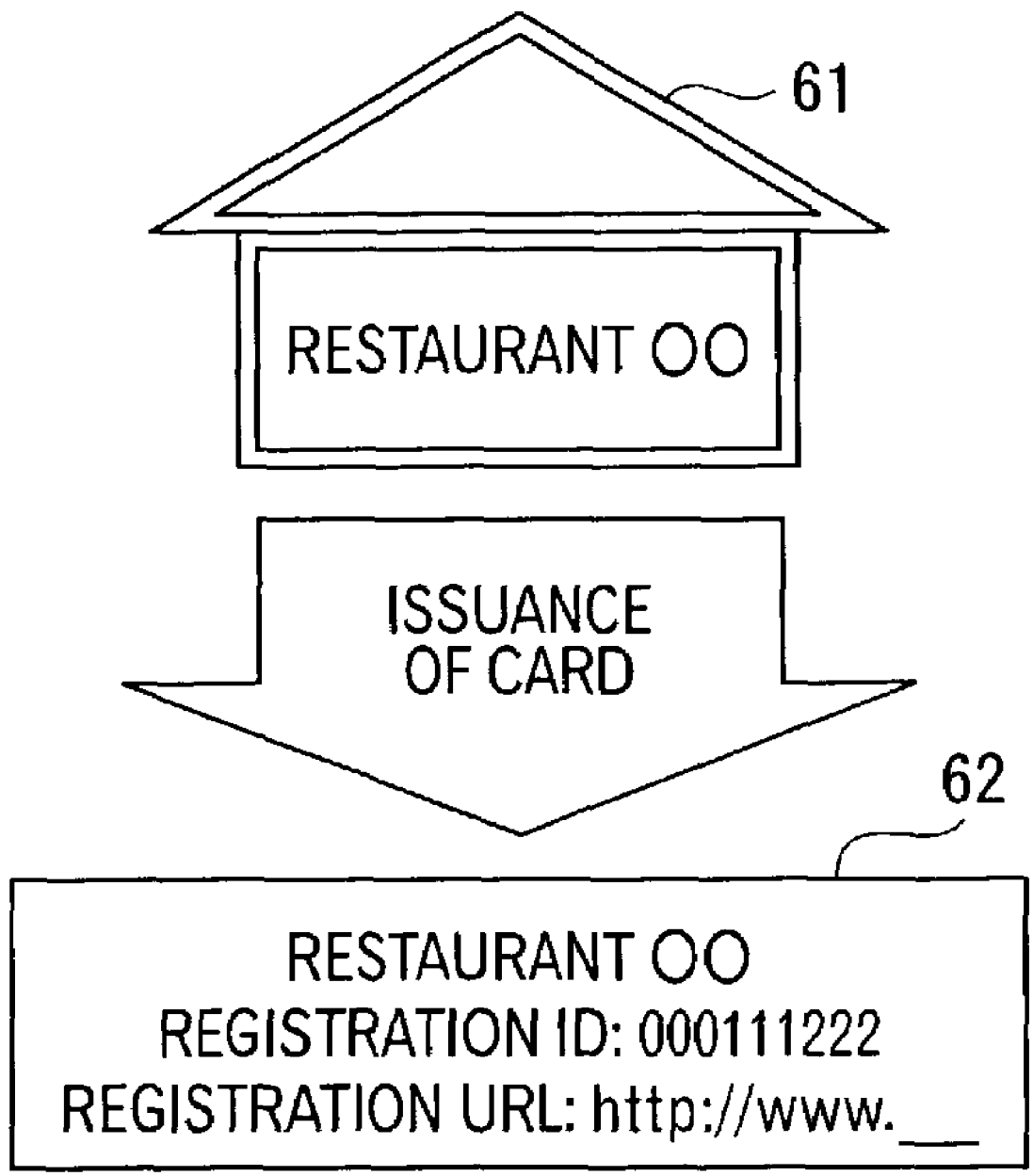
FIG. 13 is an explanatory view for an operation for registering a point card of a system member in the embodiment.
Figure 14:
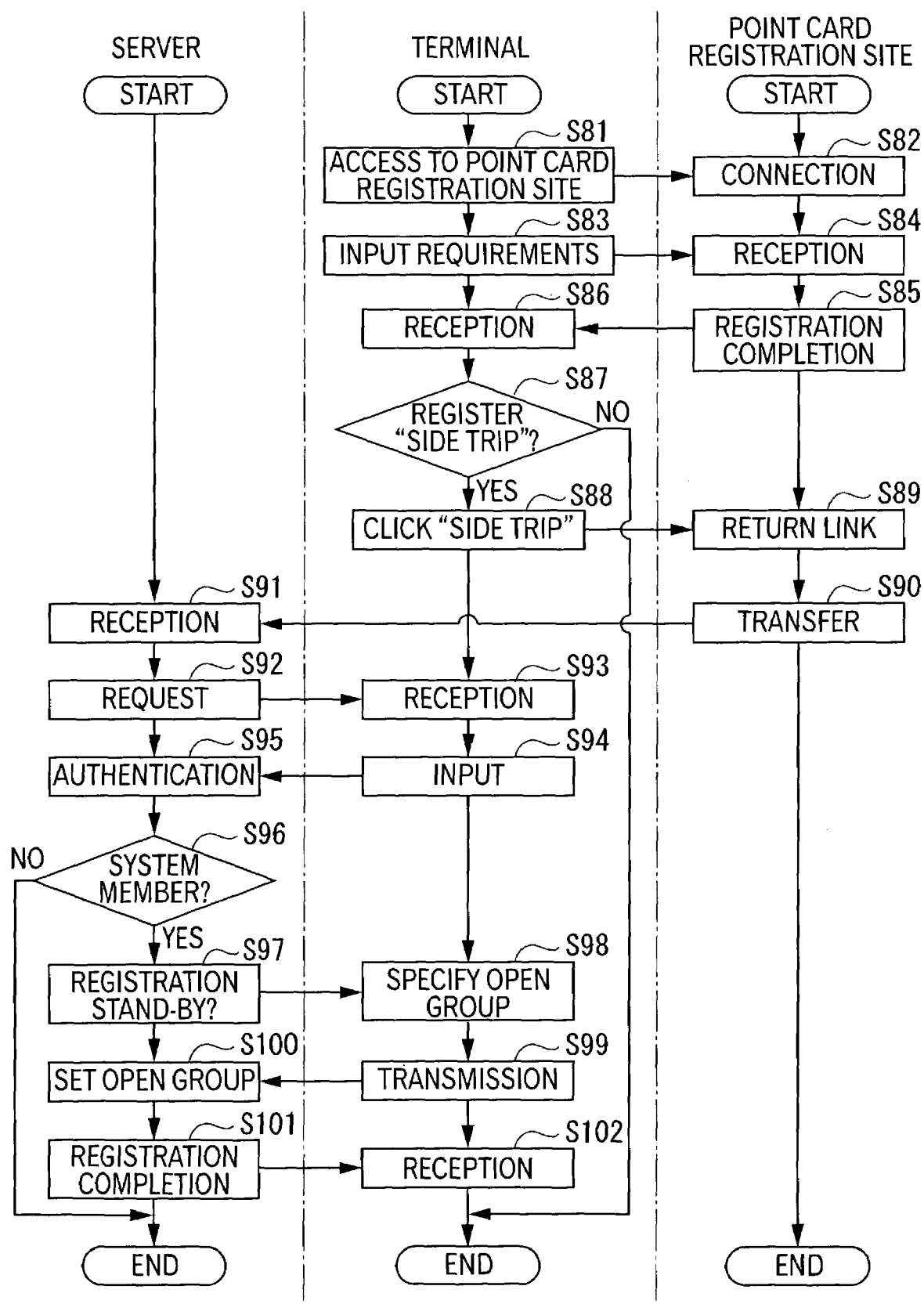
FIG. 14 is a flowchart showing an operation for registering a point card in the embodiment.

An operation of registering points as data of users who have a membership of the data processing system 1 will now be described with reference to the drawings. FIG. 13 is a schematic view showing a point system registration card for registering a point card distributed from a shop. FIG. 14 is a flowchart showing an operation of registering a point card. FIG. 15 is a schematic view showing a guide which invites an input to tell whether shop data should be open to groups or not. In this case, points are rates used in a so-called point system. For example, as shown in FIG. 13, the point system is a service from a shop 61 such as a restaurant or electric appliance shop. Points are given to a user when he or she user the shop 61. Various services are provided when points are stored to some extent.

When a user uses the shop 61, the shop 61 provides a point system registration card 62 which authenticates registration for a point system to which the shop 61 belongs, as shown in FIG. 13. Recorded on the point system registration card 62 are the name of the shop 61, a registration ID assigned to the shop 61 (where registration IDs are assigned respectively to shops), and URL of a point card registration-site for management of point cards.

The user who has attained the point system registration card 62 carries out registration for the point system. Specifically, the user uses the terminal 3 or mobile navigator 4 to access the point card registration-site via the network 2, based on the URL data of the point card registration-site recorded on the point system registration card (step S81).

The access to the point card registration-site in step S81 is made by operating the terminal operator 13 of the terminal 3 or the navigator operator 26 of the mobile navigator 4. Connection is made to the registration-site server 6 managed by the shop 61 via the network 2, and further to a main site of the point card registration-site. Then, the user selects to connect the new registration-site in the main site of the point card registration-site (step S82).

Further, based on a guide which invite to input predetermined requirements, the user inputs the requirements by operating the terminal operator 13 or mobile navigator 26 (step S83). The requirements may be the name, address, and E-mail address of the user, for example, like the case of personal data as described above.

The requirements inputted in step 83 are received by the registration-site server 6 (step S84). The received requirements are stored as one record into a point database (not shown), thus completing the point card registration. Then, the registration-site server 6 transmits a guide notifying the completion of the point card registration, to the terminal 3 or mobile navigator 4 (step S85). The guide transmitted from the registration-site server 6 in step S85 is received by the terminal 3 or the mobile navigator 4 (step S86). The user thus recognizes that the point card registration has been completed.

Also, the user enters an input in response to a display which invites an input expressing whether data of a shop 61, which is provided in the point card registration site and was used by the user, should be processed by the data processing system 1 (step S87). As the input expressing whether shop data should be shared or not in the data processing system 1, for example, an icon of "side trip" provided in the point card registration site to shift to the data processing system 1 is operated.

If the "Side Trip" icon is not operated in step S87, i.e., if the shop data is not shared by the data processing system 1, the processing of the point card registration ends. Waiting for an operation on the "Side Trip" icon expires in a predetermined time period after receipt of the guide notifying the completion of registration, or is terminated when the user sets termination of the point card registration by the terminal operator 13 or the navigator operator 26.

If the "Side Trip" icon is operated in response to the guide in step S87 (step S88), the registration-site server 6 recognizes the operation and executes a processing of linking the terminal 3 or the mobile navigator 4 with the server 5 which constitutes the data processing system 1 (step S89). Further, the registration-site server 6 transmits the shop data together with the registration data of the user inputted in step S83, to the server 5 (step S90).

The server 5 receives the registration data of the user and the shop data which are transmitted in step S90 (step S91). The server 5 then outputs a signal which enables transmission/reception of data to/from the terminal 3 or mobile navigator 4 (step S92). Further, the terminal 3 or mobile navigator 4 receives the signal from the server 5 (step S93), and the user ID and personal password are inputted in order to connect to the server 5 by an operation from the terminal operator 13 and navigator operator 26 (step S94).

The server 5 receives the user ID and personal password inputted in step S94 (step S95). The system controller 42 of the server 5 compares the user ID and personal password with personal data stored in the personal list table 51 in the personal data management database 48, to determine whether the user is a system member or not (step S96).

If the user is determined to be a not system member in step S96, the point card registration processing ends. Alternatively, a guide may be given to invite retrial to input a correct user ID and a correct personal password. If retried input fails a predetermined number of times or if cancellation of access is inputted, the point card registration processing may then be terminated.

If it is determined in step S96 that the user is a system member, the system controller 42 transmits a guide inviting input about whether the shop 61 which has been registered for the point card should be opened or not to a group in the data processing system 1 in order to create shop data in the data processing system 1 (step S97). That is, the system controller 42 transmits a guide as shown in FIG. 15. In this guide concerning a group to be opened, the group in which the user participates is searched for from the group list table 52, for example, based on the user ID recognized in step S95, and the name of the searched group is announced. The guide shown in FIG. 15 is an example which displays a comment saying that the shop 61 has been registered for the point card, the name of the group in which the user participates, and plural check boxes 64 corresponding to names of groups and provided to specify a group to which the shop is opened.

The user then operates the terminal operator 13 or the navigator controller 26, to input which group the data of the shop 61 subjected to the point card registration in accordance with the guide should be opened to (step S98). The user then transmits the inputted data to the server 5 (step S99). The server 5 attains the data transmitted from the terminal 3 or the mobile navigator 4 (step S100). The server 5 creates shop data as shown in FIG. 8, and makes the data stored as one record in the shop table 53. Recorded as one record of the shop data are the user ID attained in step S95, and the group ID data of the group attained in step S95, to which the shop data should be opened to be opened, together with a shop code transmitted in step S90, a genre code expressing the type of the shop 61, latitude and longitude data as position data of the shop 61 searched from the shop code on the basis of the map data MP in the map data database 47.

Further, a notification saying the completion of creation of the shop data in step S100 is transmitted to the terminal 3 or mobile navigator 4 (step S101). The terminal 3 or mobile navigator 4 receives the notification (step S102), and the point card registration processing thus ends.

As has been described above, a specific group is created on a site from personal data and group data so that data can be shared only within the group. Therefore, a specific shop 61 can be opened only to members of the group so that the shop 61 might not be crowded and the members can use the shop 61 like a hiding place, for example. In addition, it is possible to avoid troublesome labor of distributing the data of the shop 61 to each of particular members. Further, the data concerning the shop 61 together with map data MP is opened to the group, so that accumulation or disclosure of data can be achieved easily with high efficiency.

(Use of Data in Data Processing System)

Figure 16:
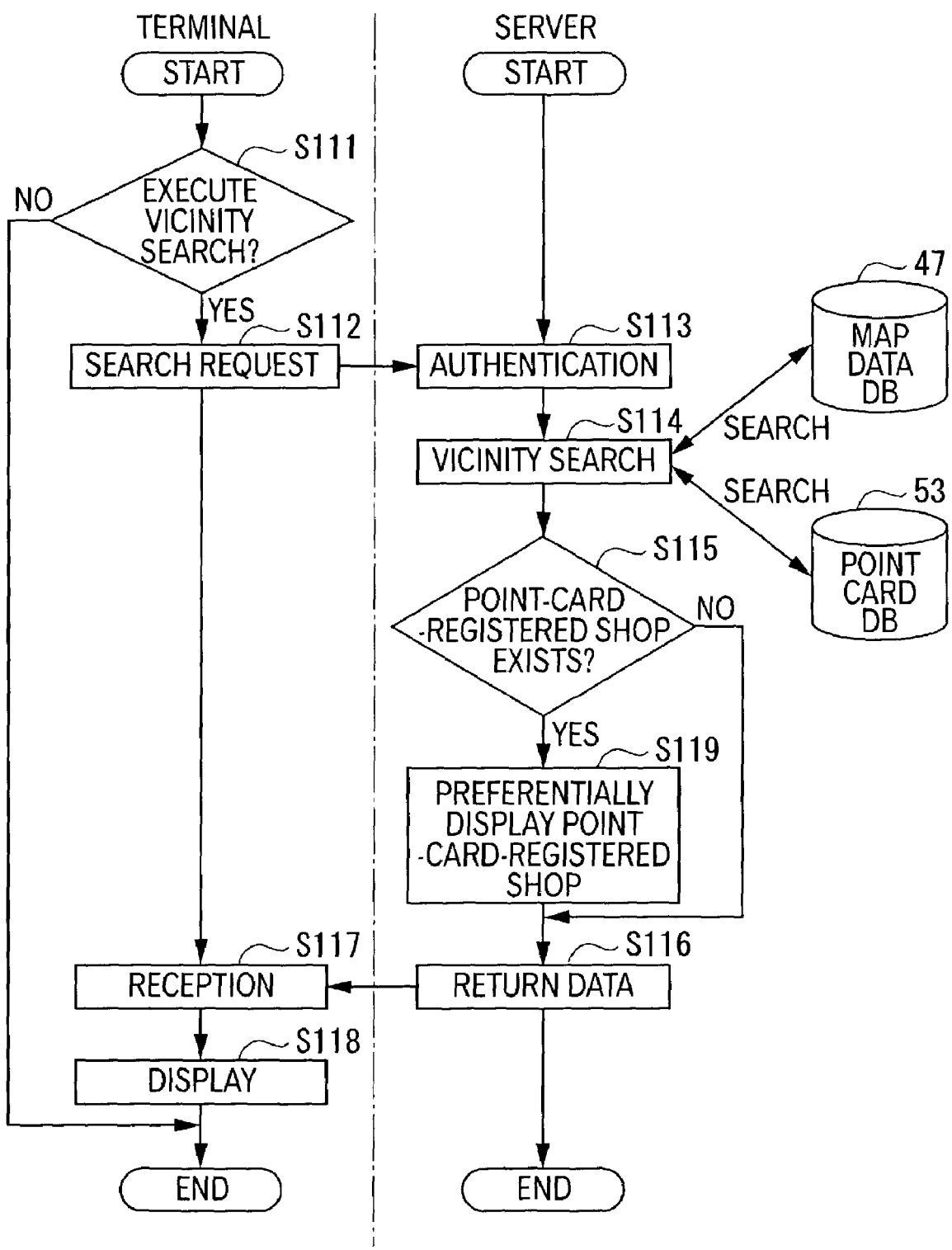
FIG. 16 is a flowchart showing an operation of using shop data in the embodiment.
Figure 18:
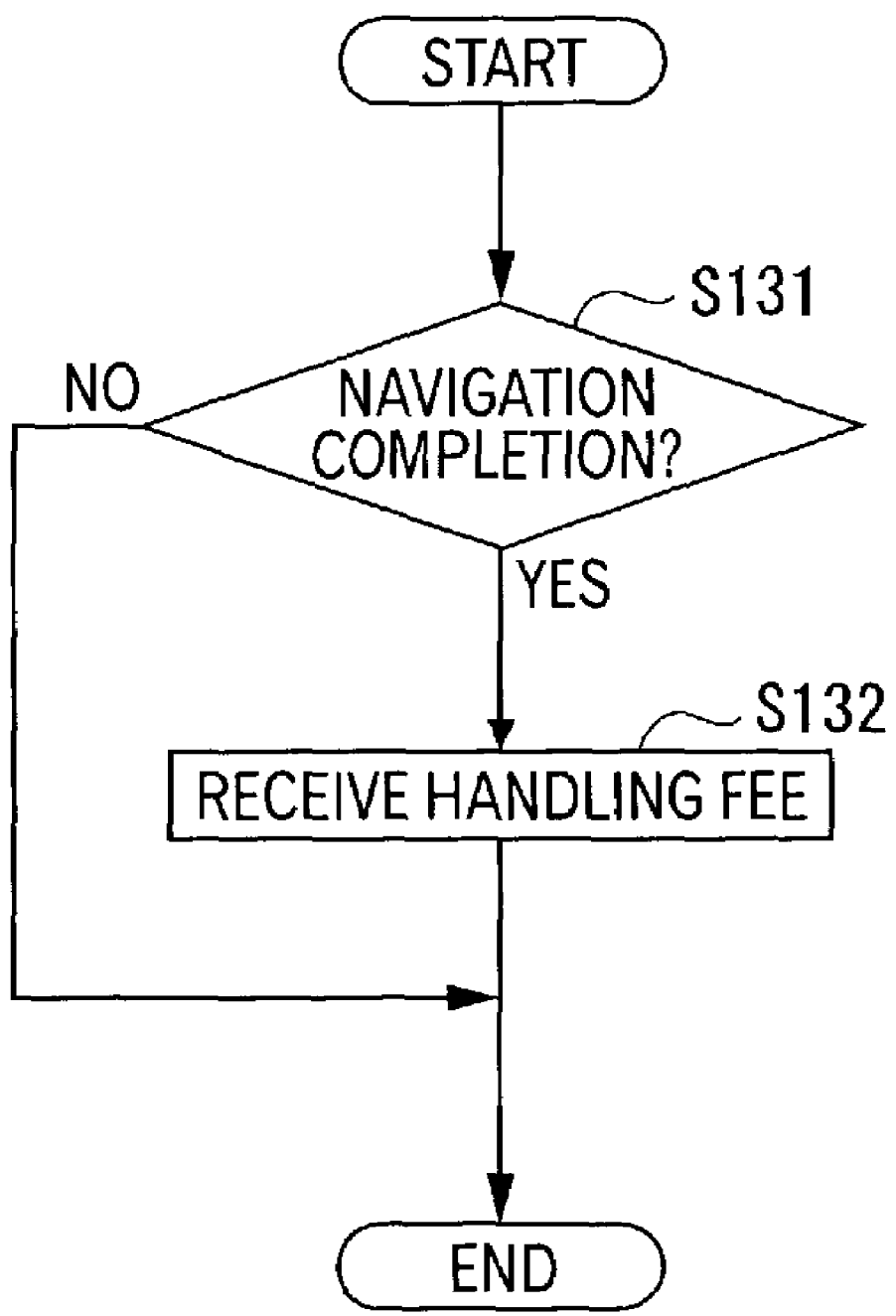
FIG. 18 is a flowchart showing an operation of receiving a handling fee when guide navigation is carried out to a shop in the embodiment.

A processing operation for shop search as use of data accumulated in the data processing system 1 will now be described with reference to the drawings. FIG. 16 is a flowchart showing an operation of disclosing shops registered for a point card. FIG. 18 is a flowchart showing an operation of collecting a handling fee as an advertisement expense in a case of navigation to shops registered for a point card.

Firstly, to attain shop data for food and drink or shopping, a user arranges a setting for using a vicinity search processing of the data processing system by the terminal 3 or mobile navigator 4, as shown in FIG. 16 (step S111). According to the setting in step S111, the terminal 3 or mobile navigator 4 transmits a signal requesting execution of the vicinity search to the server 5 (step S112).

Further, the server 5 recognizes a signal requesting execution of vicinity search (step S113), and then, the system controller 42 of the server 5 executes vicinity search (step 114). In the vicinity search, for example, current position data of the terminal 3 or mobile navigator 4 is attained. In addition, a shop 61 existing in an area of a predetermined radius from the current position is searched for, based on the map data MP stored in the map data database 47 and the position data of the shop data stored in the shop table 53 in the personal data management database 48.

As a result of the vicinity search in step S114, a determination is made on whether the shops 61 registered for the point card exist within the area range or not (step S115). If the shops 61 registered in the point system is not determined to exist within the area range, data of the shops 61 contained in the map data MP is directly transmitted to the terminal 3 or the mobile navigator 4 (step S116). The terminal 3 or the mobile navigator 4 receives the transmitted data of the shops 61 (step S117), and displays the data on the terminal display 14 or the navigator display 27 (step S118). The processing of the vicinity search thus ends.

If it is determined in step S115 that there exist shops 61 registered for the point card, a processing is applied to give priority to the shops 61 which have been registered for the point card in displaying the shops (step S119). The processing of displaying the shops for each of which the point card is registered in greater priority to the other shops for which the point card is not registered may adopt any display methods as follows. For example, in step S118, the icons of the shops 61 are displayed to be larger than icons of other shops, colored differently, flickered, brighter, with shaper profiles without vagueness, or the like, from icons of other shops.

Further, data processed in step S119 is transmitted to and displayed appropriately on the terminal 3 or mobile navigator 4 in step S116.

By the processing shown in FIG. 16, labor of registering points at the shops 61 are not necessitated any more, so the point management and customer management can be performed easily by using computers. Since the shops 61 for which the point card has been registered are displayed prior to other shops, the user can easily search for the shops 61 for which the user's point card has been registered, and feasible use of shops owing to use of points can be improved, thereby increasing conveniences.

(Data Processing in Guide Navigation)

Figure 17:
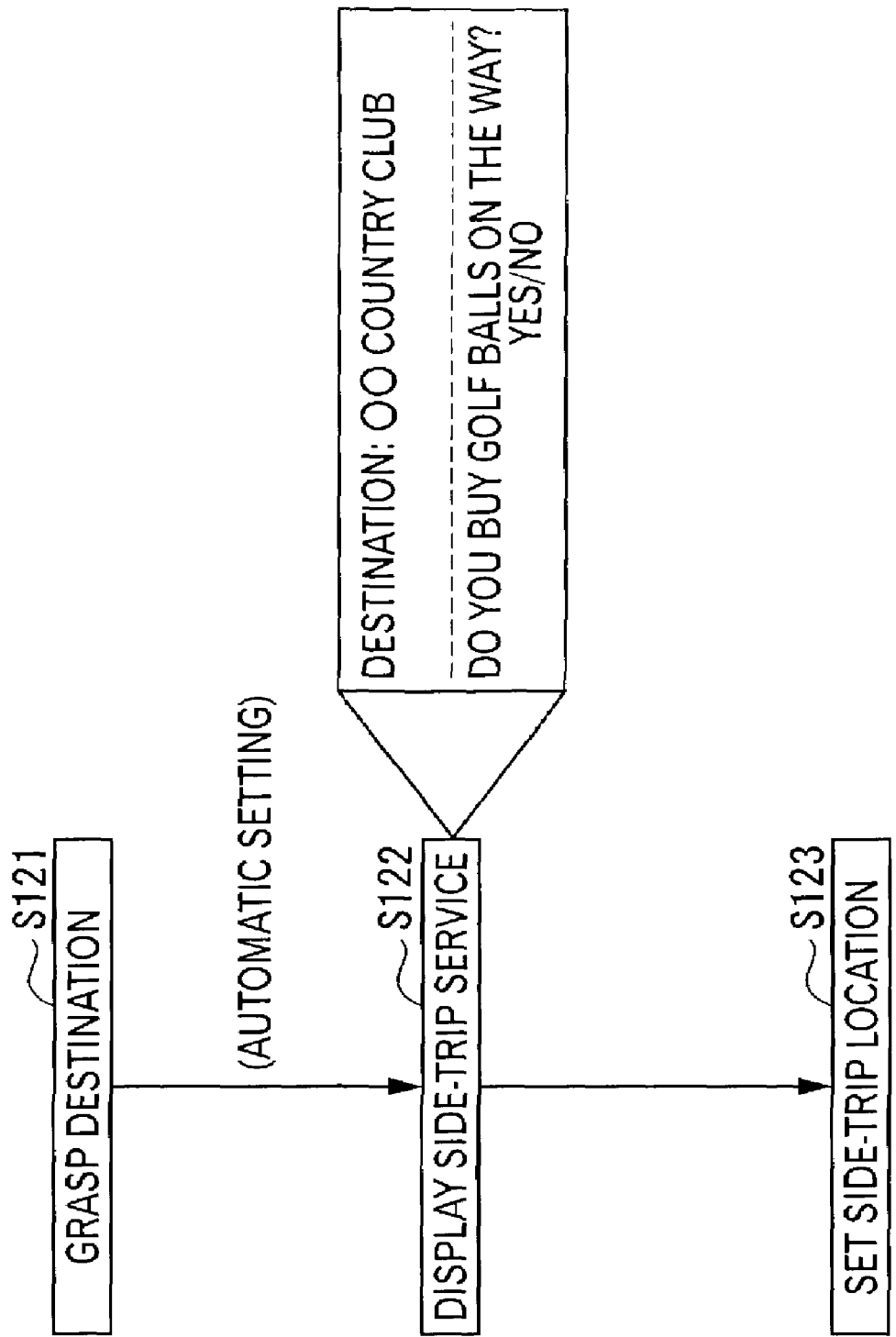
FIG. 17 is a flowchart showing an operation using shop data in guide navigation to a destination in the embodiment.

A processing operation in guide navigation as use of data stored in the data processing system 1 will now be described with reference to the drawings. FIG. 17 is a flowchart showing an operation of navigation to a shop 61 for which a point card has been registered.

When a user moves to a predetermined destination using the mobile navigator 4, the user operates the navigator operator 26 to input and set a moving route. In setting a moving route, various route search conditions such as a route of the shortest time, a route of the shortest distance, a route of avoiding jams and regulations are set together with the destination. According to the setting, the navigator controller 29 recognizes the current position, based on GPS data, velocity data, azimuth data, and acceleration data. The controller 29 further calculates and sets a moving route from the current position to the destination, based on map data MP which has been attained in advance.

The navigator controller 29 also recognizes relevant shops 61, based on data concerning the set destination, as shown in FIG. 17 (step S121). The navigator controller 29 then controls, for example, the navigator display 27 to display a guide which invites input about whether the relevant shops 61 should be searched for or not (step S122). More specifically, if the destination is a golf course, the guide invites the user to input whether the user would buy goods such as golf balls or the like, whether the user would have a meal, or whether the user would practice in a driving range on the way to the golf course.

The user hence inputs to search for relevant shops 61. The navigator controller 29 then connects to the server 5 to search for shops 61 in the vicinity of the moving route, and transmits shop data thereof if any to the mobile navigator 4. Further, the user sets a desired shop 61 (step S123). Upon this setting, the mobile navigator 4 reroutes the moving route which contains the shop 61 set as a side-trip point on the route, finally determines a moving route, and displays the determined moving route appropriately on the navigator display 27.

If a shop 61 for which the user's point card has been registered is found as a result of the search for relevant shops 61, the shop may be displayed with higher visibility than other shops.

The processing shown in FIG. 17 increases opportunities to navigate users to shops 61 whose shop data is stored, so that greater advertisement effectiveness can be expected. In particular, since shops 61 relevant to the purpose in moving are searched for, the advertisement effectiveness can be increased much more. Further, as a search result, the shops 61 are displayed in a display mode with higher visibility than other shops, so that the advertisement effectiveness can be increased furthermore.

In addition, the application to the mobile navigator 4 allows the user to easily set a moving route including side-trip points in advance, so that conveniences for the user can be improved. In case of searching for shops based on the current position while moving, the user is not guided before the user reaches the vicinity of a shop 61 to which the user desires to make a side trip. A problem may hence arise in that the moving route must be rapidly changed. However, if the shop 61 relevant to the purpose of the moving is searched for in advance, the user can move now with composure.

(Handling Fee Collection Operation Based on Guide Navigation)

Operation of collecting a handling fee based on guide navigation from an advertisement client shop to which guide navigation is carried out in FIG. 17 will now be described with reference to the drawings. FIG. 18 is a flowchart showing an operation of collecting a handling fee based on guide navigation.

First, if data processing is executed for guide navigation to an advertisement client shop 61 as shown in the flowchart in FIG. 17, data processing operation thereof ends and it is determined whether the guide navigation to the advertisement client shop 61 has been completed or not (step S131). The completion of guide navigation in step S131, for example, is recognized as the server 5 recognizes a signal transmitted from the mobile navigator 4 when a reservation, order, or previous payment is made for a commercial item to purchase by operating the navigator operator 26 of the mobile navigator 4, a signal transmitted from a terminal computer of the shop 61 and notifying a completion of the reservation, order, or payment for a commercial product recognized by the shop 61, or a signal transmitted from an organization which manages the IC card used for a payment and notifying completion of the payment.

Otherwise, the completion of the guide navigation may be recognized as the server 5 recognizes arrival at the shop 61, from position data based on various sensor data of the mobile navigator 4. Further, the completion of the guide navigation may be recognized by an input from an input portion of the server 5 upon a contact from the shop 61 by telephone.

The server 5 thus recognizes the completion of guide navigation in step S131. Then, the server 5 executes a processing for attaining a predetermined handling fee from the shop 61. For example, the server 5 executes a processing of sending a bill or taking a procedure of charging the handling fee from a predetermined financial organization, or executes a processing of displaying a suggestion inviting a manager of the data processing system 1 to carry out such a processing or procedure (step S132). The processing then ends.

Note that handling fees may be applied to the case of navigation only and the case of actual payment and may also be set depending on the number of users navigated to shops 61 or depending on amounts of payments from users. If handling fees should depend on the number of navigated users, the handling fees may be set based on signals received by the server 5, such as a signal set and inputted from the mobile navigator 4, a signal expressing the number of automatically detected users by the number of customers detection sensor installed in the shop 61, a signal expressing an amount and outputted from a terminal at the payment, and the like.

Thus, in the processing operation shown in FIG. 17, not only relevant shops 61 are reported but also shops 61 to which aggressive navigation is carried out are reported. Therefore, advertisement performance increases greatly, so that great advertisement effectiveness can be expected. In addition, a new service of collecting handling fees therefrom can be achieved.

That is, in contrast to conventional advertisements merely presented on homepages, the present system is configured such that handling fees are charged for the results of actual navigation. Therefore, advertisement performance is very high, and the efficiency in sales is improved. Enhancement of use can be expected with ease.

[Advantages of the Data Processing System]

As has been described above, in the data processing system 1 according to the above embodiment, when group attribute data specific to a group linked to personal data inputted from a terminal 3 is attained, group identification data corresponding to the group attribute data is created and outputted to the terminal 3, and the group attribute data and the group identification data are stored as group data. Further, when the group attribute data and group identification data are inputted from the terminal 3, whether the data are authenticated or not is determined. If the data are determined to be authenticated, report data linked to the group attribute data is rendered readable for the terminal 3. Therefore, data concerning a favorite shop 61 can be shared as report data between limited friends, for example. The favorite shop 61 can be used as if it is a hiding place or the like. Differentiated management and disclosure of data can thus be achieved easily.

Only in case where group attribute data different from stored group attribute data is recognized, group identification data is created in correspondence with the attained group attribute data, and a new group is registered. In this way, report data can linked to plural different groups and can be shared among the groups. Thus, improvements in applicability to general purposes and conveniences can be achieved.

Further, since a predetermined setting input from a terminal 3 can be recognized, group attribute data and group identification data together with guide data which invites participation in a group can be outputted to a predetermined terminal 3, for example, for friends with whom report data is desired to be shared. It is therefore unnecessary to distribute separately a guide, and services are easy. As a result, management of groups to share differentially report data within each group can be achieved easily.

Based on an input (step S71) determining participation from a terminal 3, a user ID and personal password which is personal data inputted when the determination is inputted and which authenticates a system member are linked to group data corresponding to a group in which the system member participates and stored as new group data into the group list table 52 in the storage 43. Therefore, when a new member participates in a group, the processing for sharing shop data as report data is automatically updated, so that no separate input processing is necessitated. The processing of sharing shop data only within a specific group can be easily achieved. Accordingly, the system management can be facilitated.

As data to be processed by the data processing system 1, there is shop data including location data specified by map data MP stored in the map data database 47. Therefore, all shop data which is stored in the shop table 53 and is differentially shared only within a predetermined group has the location data specified on the basis of the map data MP. Accordingly, shop data can be easily grasped and used and need not include map data MP. It is only necessary to link map data MP with location data of shop data. Thus, handling is facilitated and loads to the shop table 53 storing shop data can be reduced.

Further, only one data processing system 1 can manage the point card registration processing and the configuration of sharing data concerning shops 61 for which registration has been made and the like within a predetermined group. Accordingly, the system configuration can be simplified and the processing efficiency can be improved.

In the management of data concerning points which has a characteristic similar to personal data, the registration-site server 6 manages shops 61, and the shop data related to the shops 61 can be linked and disclosed only within a group by the server 5. Therefore, data processing can be simplified, and the processing efficiency can be improved.

Due to the configuration in which an icon of "Side trip" to link with a site of the present data processing system 1 is provided in the point card registration-site, point card registration and data processing for opening shop data only to a predetermined group can be carried out in series. Accordingly, the operation ability can be improved, and conveniences can also be improved.

By clicking the icon of the "Side trip", the registration-site server 6 and the server 5 of the data processing system 1 are connected to each other. Point data and shop data can then be linked with map data MP of the data processing system 1 and can be dealt with as map data for users themselves. Therefore, shop data and point data can be widely used, and conveniences can be improved.

As a processing of shop data opened only within a group, use is available as an item of data for guide navigation to a destination. As a result, added value as a navigation system is given, so conveniences in use and advertisement performance can be improved.

Since the data processing system 1 is constructed by connecting the server 5 to the terminal 3 and the registration-site server 6 via the network 2, data communication can be easily achieved including management of shop data, management of points, setting of conditions in disclosing differentially shop data, acquisition of shop data from other members, and the like. As a result, conveniences in use can be improved and use can be enhanced easily.

[Modifications of Embodiment]

The present invention is not limited to the embodiment described above but may include modifications below within the scope that achieves the objects of the present invention.

Specifically, the data to be processed has been explained to be concerning shops 61. However, the data to be processed may be data concerning about outdoor activities including fishing or camps, or any data such as season data, like event data concerning festivals, astronomical observation data or scoop data. The data to be processed thus can be any data as long as the data can be shared within a group created. Like the case of the shops 61 described above, map data MP can be used for all data that is added with location data. Therefore, it is preferable for simplification of configuration, improvement in processing efficiency, and advertisement performance that the configuration of processing is arranged such that data processed on the basis of specific data such as astronomical data possessed by an astronomical observatory and the like or weather data possessed by a meteorological agency and the like can be shared only in each group.

Further, the registration method for using the present data processing system 1 is not limited to a so-called online registration method as shown in FIG. 9 but may be another method as follows. For example, an applicant for use may mail a written card or connect by telephone to inform the manager of the data processing system 1 of requirements. The manager directly register the applicant in the server 5.

The data processing for participation of a member in a group has been described with reference to the configuration in which any of organizers or members of a group can distribute a guide for participation in the group, as shown in FIG. 11. However, in distributing the guide in step S53 shown in FIG. 11, whether a guide may be distributed or not may be confirmed to the organizer of the group. Only in the case where an admission is attained, the guide may be distributed. Alternatively, the configuration may be arranged such that a predetermined password or the like which is given only to a group organizer can be attained when creating a new group. In place of the determination made in step S48 shown in FIG. 11 about whether an accessing person is a group member or not, it is possible to use an operation of confirming whether an accessing person is a group organizer or not, so that only group organizers can distribute a guide for participation of a new member.

Further, a description has been made with respect to the configuration in which notifying participation of a new member is notified to members in series of operations when a new member participates in a group. However, it is possible to adopt a processing of distributing the notification separately in accordance with a request from the new member or an organizer.

Further, a configuration in which data can be simply shared in a created group may be adopted, without providing the processing of point card registration as shown in FIGS. 14 and 15, the vicinity search processing shown in FIG. 16, the shop search processing shown in FIG. 17, or the handling fee charge processing shown in FIG. 18.

The configuration of transmitting/receiving data via the network 2 has been described above. However, the system can be configured not only by the Internet but also, for example, by personal computers connected by cables, like a LAN (Local Area Network).

Further, the mobile navigator 4 and terminal 3 are not essential components for the data processing system 1. It is possible to connect any terminals that can use data subjected to processing by the system, such as creation of a group to share data, disclosure of data, and the like.

The server 5 and the registration-site server 6 for point card registration processing have been explained to be separate from each other. However, the configuration may be arranged such that the server 5 executes the processing of point card registration. According to this configuration, data such as personal data need not be stored, overlapped in both of the servers 5 and 6. Therefore, the configuration can be more simplified and the processing efficiency can be improved more.

The processing described above may be supplied in form of an apparatus in which a program to be executed by a computer is installed or in form of a recording medium which records the program and also a program for reading the program and operating a computer to execute the program. In this kind of configuration, computers for general purposes can be used to enhance use of the system.

Respective processings have been explained with reference to individual operations. However, in case of sequentially executing the processing of distributing a guide for participation of a new member in a group after the processing of creating a new group, for example, processing may be executed from the step S51 of distributing the guide without executing authentication of membership of a system member after creating the new group. Thus, processing can be carried out so that overlapping processing can be omitted. According to this configuration, the processing efficiency and operation ability can be improved, so conveniences in use can be improved.

Further, in the processing shown in FIG. 12, the processing step S74 of notifying participation of a new member. Note that constraints on data shared among sharing members can be securely maintained participation of a new member.

Based on the flowchart shown in FIG. 12, explanation has been made with respect to the operation for participation of a new member. For example, a similar processing can be applied to the case of withdrawal from a group. Specifically, at the time when whether participation is intended or not is determined in step S71, whether withdrawal is intended or not may be confirmed. If the confirmation is transmitted to the server 5 (step S72), the server 5 may release a link of personal data from group data. To be specific, the record of an inputted member ID may be deleted (step S73). Also in this case, a guide notifying the withdrawal may be distributed to other members (step S74) or the distribution processing may be omitted.

Also, explanation has been made with respect to the configuration in which the mobile navigator 4 is mounted on a vehicle to support driving of the vehicle. However, application is available to guide a walker moving, for example, if the walker carries the navigator.

Also, explanation has been made of a configuration in which the navigator controller 29 is provided in the mobile navigator 4 and further mounted on a vehicle. However, the navigator controller 29 may be provided separately in the server 5. Data from various sensors mounted on the vehicle may be transmitted to the server 5 via a communication portion. The system controller 42 in the server 5 may execute processing concerning the current position, moving routes, vicinity search, shop search, or the like. Guides may then be displayed on the navigator display 27 or generated as voices from a voice generation portion such as a navigator audio conductor 28. In this case, components to be mounted on the vehicle are reduced so that lighter weight and smaller size can be easily achieved.

The configuration is arranged such that data is stored into the map data storage 25 of the mobile navigator 4 from the map data database 47 of the server 5 via the wireless medium 32. The map data storage 25 may be configured by using a driver that appropriately reads the map data MP stored in a recording medium. Note that, the map data MP is attained through communications in the above described embodiment, by arranging the map data MP, that has immense volumes of data, in the server 5, lighter weight and smaller size of the navigator 4 can be easily achieved.

The map data MP is not limited to the configuration using links L described above but may have any data form. For example, the map data MP may be configured by combining nodes with data indicating directions branched from the nodes.

Furthermore, specific configurations and procedures in practicing the present invention can be appropriately modified into other configurations within the scope that achieves the objects of the present invention.

What is claimed is:

1. A data processing system, comprising:
a data processing apparatus; and
a navigation apparatus which guides movement of a vehicle, wherein
the data processing apparatus includes:
a personal data storage which stores personal data;
a group attribute data attaining portion which attains group attribute data specific to a group linked to the personal data inputted from a terminal;
a group identification data creation portion which creates group identification data in correspondence with the attained group attribute data, as the group attribute data attaining portion recognizes the group attribute data, and outputs the group identification data to the terminal;
a group data storage which stores, as group data, the group attribute data attained by the group attribute data attaining portion and the group identification data created by the group identification data creation portion;
an authentication portion which compares the group attribute data and group identification data inputted from the terminal, with the group data stored in the group data storage;
a map data storage which stores map data;
a report data storage which stores report data which is inputted from the terminal, with report data being linked to the group attribute data, the report data having location data of a shop specified by the map data and genre information related to type of the shop; and
a data disclosure portion which outputs only such report data among the report data stored in the report data storage that is linked to the group attribute data, to the terminal from which the group attribute data and group identification data are inputted, as the authentication portion recognizes that the group attribute data and group identification data inputted from the terminal are identical to the group data stored in the group data storage,
wherein the navigation apparatus:
searches a first movement path from a current position to the shop based on the report data upon receiving a search request from a user;
reports a secondary shop data related to the genre information of the inputted report data and located around the movement path to the shop;
again searches a second movement path from the current position to the second shop designated by the secondary shop data as a side-trip point based on the map information; and
merges the first movement path and the second movement path to construct a new movement path to guide the vehicle.

2. The data processing system according to claim 1, wherein
the group identification data creation portion creates the group identification data in correspondence with the attained group attribute data and outputs the group identification data, only in case where it is recognized that group attribute data different from the group attribute data stored in the group data storage is attained by the group attribute data attaining portion.

3. The data processing system according to claim 1, further comprising a guide data output portion which outputs the group attribute data and group identification data to a predetermined terminal, together with guide data which invites participation in the group, based on a predetermined input from the terminal.

4. The data processing system according to claim 1, further comprising a participation/withdrawal processing portion which, based on personal data and an input determining participation in or withdrawal from a group from a terminal, links group attribute data corresponding to the group to the personal data inputted from the terminal, to prepare new group data, in case where the input determines participation, or releases a link of the personal data to group attribute data corresponding to the group, to prepare new group data, in case where the input determines withdrawal, and stores the new group data into the group data storage.

5. The data processing system according to claim 4, wherein the participation/withdrawal processing portion recognizes the input determining the participation and accordingly gives a guide notifying that new participation has taken place, based on the personal data linked to the group attribute data of the group in which the participation has been determined.

6. A data processing method of processing report data, allowing the report data to be used within a predetermined group, by using a navigation apparatus which guides movement of a vehicle, the method comprising steps of:
recognizing an input of group attribute data specific to a group linked to personal data;
creating group identification data in correspondence with the group attribute data the input of which has been recognized, outputting the group identification data to a side of the input, and storing the group attribute data and group identification data as group data;

storing map data;

recognizing an input of group attribute data and group identification data, comparing the group attribute data and group identification data with the stored group data, and outputting only report data which is linked to the compared group attribute data, among report data which is inputted while linked to group attribute data and has location data of a shop specified by the map data and genre information related to type of the shop; and displaying the report data on a display of the navigation apparatus which searches a first movement path from a current position to the shop based on the report data upon receiving a search request from a user;

reports a secondary shop data related to the genre information of the inputted report data and located around the movement path to the shop;

again searches a second movement path from the current position to the second shop designated by the secondary shop data as a side-trip point based on the map information; and merges the first movement path and the second movement path to construct a new movement path to guide the vehicle.

7. A data processing program which makes a computer execute the data processing method according to claim 6.

8. A recording medium in which the data processing program according to claim 7 is recorded to be readable for a computer.

9. The data processing system according to claim 1, further comprising a map data storage which stores map data, wherein the report data attaining portion attains report data having location data specified by the map data.

* * * * *